(12) United States Patent
Kono

(10) Patent No.: US 9,400,621 B2
(45) Date of Patent: Jul. 26, 2016

(54) INFORMATION PROVIDING APPARATUS, TERMINAL DEVICE, INFORMATION PROVIDING SYSTEM, AND COMPUTER READABLE MEDIUM

(75) Inventor: Daisuke Kono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 697 days.

(21) Appl. No.: 13/479,766

(22) Filed: May 24, 2012

(65) Prior Publication Data
US 2013/0095890 A1 Apr. 18, 2013

(30) Foreign Application Priority Data

Oct. 12, 2011 (JP) .................................. 2011-225306

(51) Int. Cl.
*H04B 1/38* (2015.01)
*G06F 3/12* (2006.01)
(Continued)

(52) U.S. Cl.
CPC .......... *G06F 3/1204* (2013.01); *H04N 1/00424* (2013.01); *H04N 1/00435* (2013.01); *H04N 1/00464* (2013.01); *H04N 1/00474* (2013.01); *H04N 1/00482* (2013.01); *H04N 1/00503* (2013.01); *H04N 1/00923* (2013.01); *H04N 1/00973* (2013.01); *H04N 1/32496* (2013.01); *H04N 1/33384* (2013.01); *H04W 64/00* (2013.01); *G06F 3/1232* (2013.01);
(Continued)

(58) Field of Classification Search
CPC ................................ H04W 88/02; G06F 15/00
USPC ................ 455/557, 41.3, 41.2, 41.1; 358/1.9, 358/1.15, 2.1, 400
See application file for complete search history.

(56) References Cited

U.S. PATENT DOCUMENTS 8,218,179 B2 * 7/2012 Nakajima ............ G06Q 20/105
358/1.15
8,482,774 B2 7/2013 Okada et al.
(Continued)

FOREIGN PATENT DOCUMENTS

JP 2000-057042 A 2/2000
JP 2002-509631 A 3/2002
(Continued)

OTHER PUBLICATIONS

Japanese Office Action issued Oct. 8, 2013 in corresponding Japanese Patent Application No. 2011-225306.

*Primary Examiner* — Md Talukder
(74) *Attorney, Agent, or Firm* — Sughrue Mion, PLLC

(57) ABSTRACT

An information providing apparatus includes a receiving unit and a transmitting unit. The receiving unit receives, from a terminal device connected to the information providing apparatus via a communication path, operation state information indicating an operation state of the terminal device. If it is determined, based on the operation state information, that the terminal device is in a specific operation state associated with an image processing operation, the transmitting unit transmits to the terminal device one or plural pieces of specific information associated with an image processing operation executable after the specific operation state has been completed. When transmitting the plural pieces of specific information to the terminal device, the transmitting unit transmits the plural pieces of specific information to the terminal device in accordance with priorities. The priorities are assigned to the plural pieces of specific information in accordance with the specific operation state.

10 Claims, 12 Drawing Sheets

(51) Int. Cl.
*H04W 64/00* (2009.01)
*H04N 1/00* (2006.01)
*H04N 1/32* (2006.01)
*H04N 1/333* (2006.01)

(52) U.S. Cl.
CPC ...... *G06F3/1253* (2013.01); *H04N 2201/0039* (2013.01); *H04N 2201/0075* (2013.01); *H04N 2201/0094* (2013.01)

(56) References Cited

U.S. PATENT DOCUMENTS

| | | | | |
|---|---|---|---|---|
| 8,749,823 B2* | 6/2014 | Kato | ..................... | G06F 3/1222 358/1.14 |
| 2004/0070591 A1* | 4/2004 | Kato | ....................... | G06F 3/038 715/709 |
| 2007/0124512 A1* | 5/2007 | Park | ..................... | G06F 3/1204 710/8 |
| 2007/0229891 A1* | 10/2007 | Yanagi | ................... | H04L 67/18 358/1.15 |
| 2008/0186536 A1* | 8/2008 | Shimizu | ............. | H04N 1/00204 358/1.15 |
| 2008/0192281 A1* | 8/2008 | Hagiwara | .......... | G03G 15/5012 358/1.15 |
| 2010/0054762 A1* | 3/2010 | Kim | ................... | G03G 15/5079 399/8 |
| 2010/0156975 A1* | 6/2010 | Morooka | ............... | B41J 2/2139 347/14 |
| 2010/0290068 A1* | 11/2010 | Okada | .................... | G03G 15/50 358/1.9 |
| 2010/0290074 A1* | 11/2010 | Kuroishi | ............ | G03G 15/5004 358/1.14 |
| 2010/0293400 A1* | 11/2010 | Kuroishi | ................ | G06F 3/1221 713/310 |
| 2011/0051178 A1* | 3/2011 | Kono | ................. | H04N 1/00416 358/1.15 |
| 2012/0030615 A1* | 2/2012 | Urashima | ............. | G06F 3/0482 715/794 |
| 2013/0095890 A1* | 4/2013 | Kono | .................... | G06F 3/1204 455/557 |
| 2013/0250347 A1* | 9/2013 | Kono | ................... | H04N 1/00204 358/1.15 |
| 2014/0240776 A1* | 8/2014 | Suzuki | .................. | G06F 3/1296 358/1.15 |
| 2015/0070725 A1* | 3/2015 | Monden | ................ | G06F 3/1232 358/1.15 |

FOREIGN PATENT DOCUMENTS

| | | |
|---|---|---|
| JP | 2004-152276 A | 5/2004 |
| JP | 2007-532056 A | 11/2007 |
| JP | 2008-210383 A | 9/2008 |
| JP | 2009-187176 A | 8/2009 |
| JP | 2009-217508 A | 9/2009 |
| JP | 2010-268346 A | 11/2010 |
| WO | 99/30257 A1 | 6/1999 |
| WO | 2005/117295 A1 | 12/2005 |

* cited by examiner

FIG. 2

| LEVEL | DEFINITION OF OPERATION STATE | VALUE OF OPERATION STATE |
|---|---|---|
| | WHAT IS CURRENTLY OPERATING APPLICATION? | • VIEWER<br>• DATA MANAGEMENT APPLICATION<br>• EMAIL SOFTWARE<br>• ADDRESS BOOK |
| | WHAT OPERATION IS BEING PERFORMED WITH CURRENTLY OPERATING APPLICATION? | <MAP APPLICATION><br>A MAP OF THE XXX AREA IS BEING DISPLAYED.<br><AUTHORING APPLICATION><br>AN IMAGE IS OPENING. |

FIG. 3

| APPLICATION | OPERATION STATE |
|---|---|
| VIEWER | A FILE IS BEING DISPLAYED |
| DATA MANAGEMENT APPLICATION | A FOLDER IS BEING DISPLAYED |
| EMAIL SOFTWARE | AN EMAIL IS BEING CREATED |
| ADDRESS BOOK | A DESTINATION IS BEING DISPLAYED |

FIG. 4

| OPERATION STATE | PRIORITY, FUNCTION |
|---|---|
| A FILE IS BEING DISPLAYED | (1) PRINTING from TERMINAL DEVICE<br>(2) FACSIMILE TRANSMISSION from TERMINAL DEVICE<br>(3) DISPLAY OF A LIST OF FUNCTIONS |
| A FOLDER IS BEING DISPLAYED | (1) SCANNING to TERMINAL DEVICE<br>(2) ACQUISITION OF BOX DOCUMENT to TERMINAL DEVICE<br>(3) DISPLAY OF A LIST OF FUNCTIONS |
| AN EMAIL IS BEING CREATED | (1) SCANNING to TERMINAL DEVICE<br>(2) ACQUISITION OF BOX DOCUMENT to TERMINAL DEVICE<br>(3) DISPLAY OF A LIST OF FUNCTIONS |
| A DESTINATION IS BEING DISPLAYED | (1) SCANNING to EMAIL<br>(2) SCANNING to FACSIMILE TRANSMISSION<br>(3) DISPLAY OF A LIST OF FUNCTIONS |

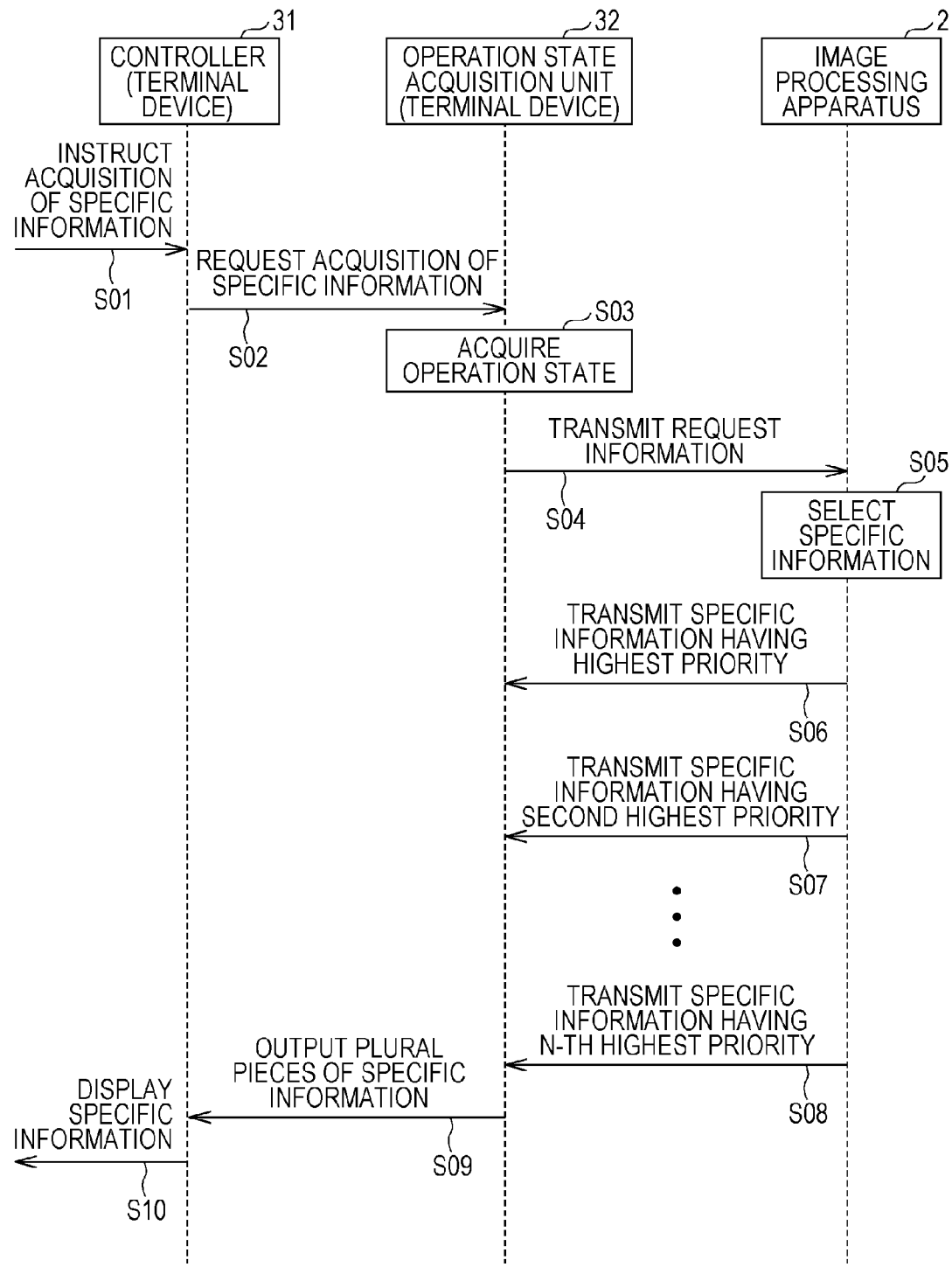

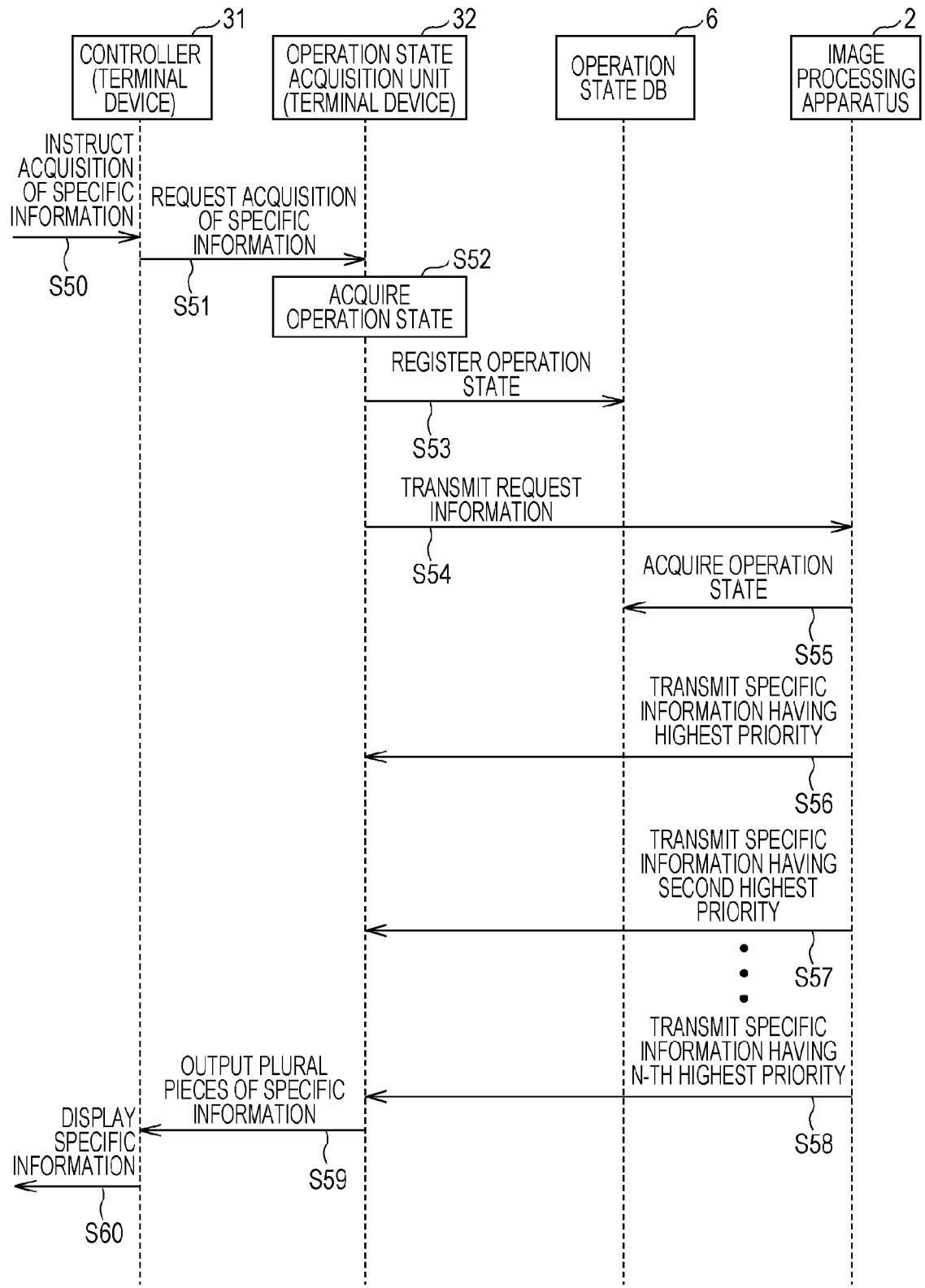

INFORMATION PROVIDING APPARATUS, TERMINAL DEVICE, INFORMATION PROVIDING SYSTEM, AND COMPUTER READABLE MEDIUM

CROSS-REFERENCE TO RELATED APPLICATIONS

This application is based on and claims priority under 35 USC 119 from Japanese Patent Application No. 2011-225306 filed Oct. 12, 2011.

BACKGROUND (i) Technical Field

The present invention relates to an information providing apparatus, a terminal device, an information providing system, and a computer readable medium.

(ii) Related Art

In some cases, specific information may be provided from an information providing apparatus to terminal devices such as mobile phones and personal digital assistants (PDAs) via communication paths such as networks.

SUMMARY

According to an aspect of the invention, there is provided an information providing apparatus including a receiving unit and a transmitting unit. The receiving unit receives, from a terminal device connected to the information providing apparatus via a communication path, operation state information indicating an operation state of the terminal device. If it is determined, based on the operation state information, that the terminal device is in a specific operation state associated with an image processing operation, the transmitting unit transmits to the terminal device one or plural pieces of specific information associated with an image processing operation executable after the specific operation state has been completed. When transmitting the plural pieces of specific information to the terminal device, the transmitting unit transmits the plural pieces of specific information to the terminal device in accordance with priorities. The priorities are assigned to the plural pieces of specific information in accordance with the specific operation state.

BRIEF DESCRIPTION OF THE DRAWINGS

An exemplary embodiment of the present invention will be described in detail based on the following figures, wherein:

FIG. 2 illustrates examples of the definitions of operation states of a terminal device;

FIG. 3 illustrates examples of operation states of the terminal device;

FIG. 4 illustrates examples of functions associated with operation states;

FIG. 5 is a sequence diagram illustrating an example of the procedure of a process performed by the image processing system according to the exemplary embodiment of the present invention;

FIG. 14 is a sequence diagram illustrating an example of the procedure of a process performed by the image processing system according to the second modification.

DETAILED DESCRIPTION

An information providing apparatus and an information providing system according to an exemplary embodiment of the present invention will be described with reference to FIG. 1. The information providing system according to this exemplary embodiment includes an information providing apparatus and a terminal device that receives provided information. The information providing apparatus according to this exemplary embodiment provides a terminal device with plural pieces of specific information in descending order of priority. The plural pieces of specific information are assigned priorities in accordance with the state of the operation being performed by the terminal device. The information providing apparatus may be an apparatus that provides a terminal device with specific information using a web application or a web service, or may be an apparatus suitable for a specific application, such as an image processing apparatus. The specific information provided by the information providing apparatus may be information to be viewed by a user on the terminal device, or may be a user interface (UI) for setting operating conditions of an apparatus suitable for a specific application on a web browser.

Figure 1:
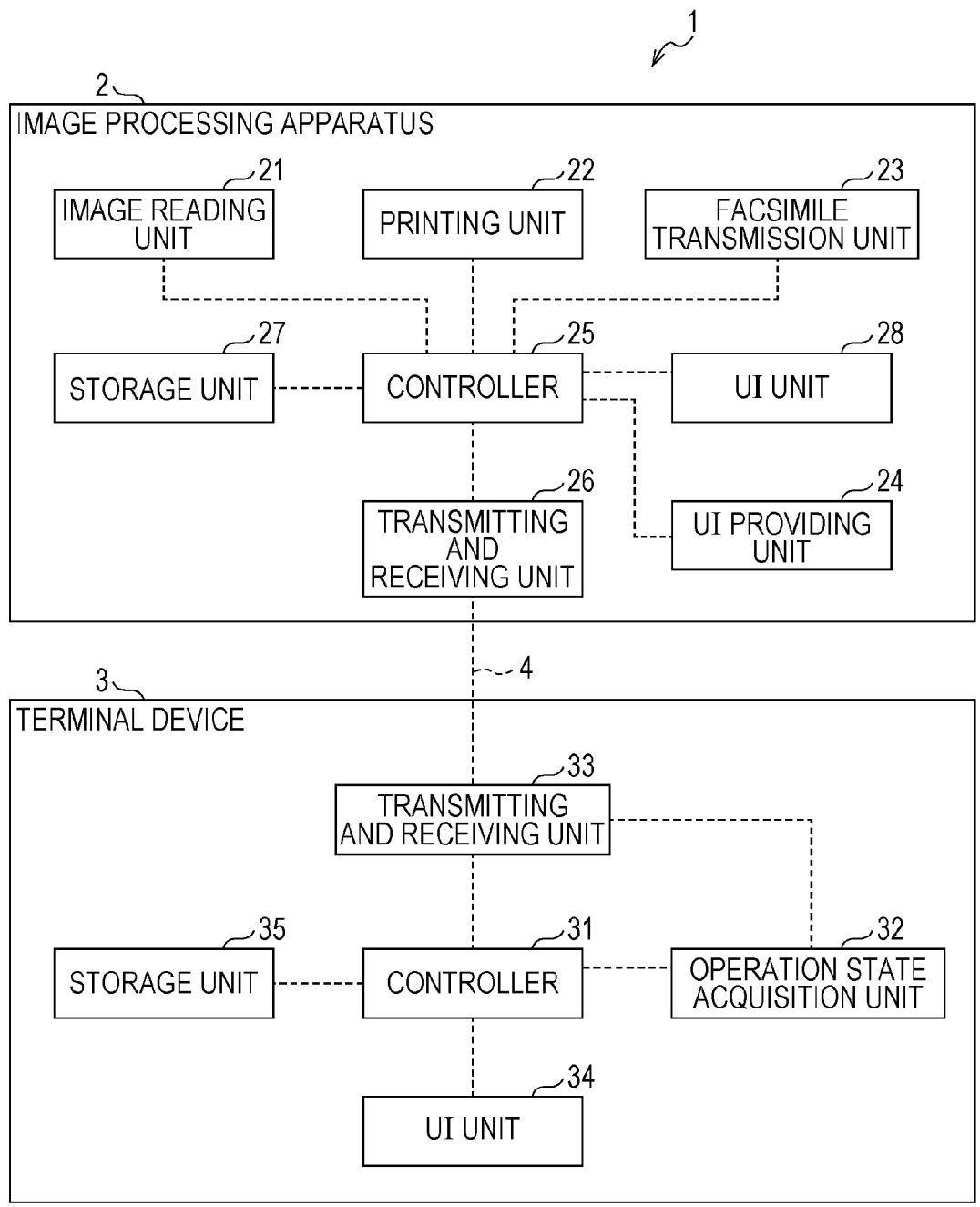
FIG. 1 is a block diagram illustrating an image processing system according to an exemplary embodiment of the present invention.

FIG. 1 illustrates an example of an image processing system 1 according to an exemplary embodiment of the present invention. The image processing system 1 includes an image processing apparatus 2 and a terminal device 3. The image processing apparatus 2 and the terminal device 3 exchange data via a communication path 4. An information providing apparatus according to an exemplary embodiment of the present invention may be implemented by the image processing apparatus 2, by way of example, and an information providing system according to an exemplary embodiment of the present invention may be implemented by the image processing apparatus 2 and the terminal device 3, by way of example. The image processing apparatus 2 will be described as an example of the information providing apparatus.

Image Processing Apparatus 2

The image processing apparatus 2 may be an apparatus having at least one of image processing functions including a function for printing received data and a function for reading a paper document and converting the read document into electronic document data. The image processing apparatus 2 may be, for example, but not be limited to, a digital multifunction peripheral having functions of devices such as a copier, a printer, a scanner, and a facsimile machine. The image processing apparatus according to this exemplary embodiment may also be a printer having no scanner function, a scanner having no printing function, or the like. For example, the image processing apparatus 2 includes an image reading unit 21 that reads an image on an original document, a printing unit 22 that prints the image on a sheet, and a facsimile transmission unit 23 that transmits the image via facsimile. The image processing apparatus 2 may also have a copying function for copying an image on an original document onto a sheet by reading the image on the original document using the image reading unit 21 and printing the read image on the sheet using the printing unit 22. The image processing apparatus 2 may be installed in a place, for example, an office, a convenience store or drugstore, a library, a hotel, or an apartment.

Terminal Device 3

The terminal device 3 may be an apparatus that can be carried, such as a mobile phone or a PDA. The terminal device 3 includes a storage unit 35 that stores input-output data such as document data or image data. The document data may be, for example, data created by the terminal device 3 using document creation application software, or may be data created by another apparatus and transmitted to the terminal device 3 via communication or the like. For example, if the terminal device 3 includes a digital camera, the image data may be data captured using the digital camera. The image data may also be data captured using another camera and transmitted to the terminal device 3 via communication or the like, or may be data read by the image processing apparatus 2 or another image reading device and transmitted to the terminal device 3 via communication or the like. In the following description, it is assumed that the input-output data includes document data, image data or a program, and other control data.

Communication Path 4

The communication path 4 may be a known communication medium. Examples of the communication path 4 include networks such as a local area network (LAN) and a wide area network (WAN). The image processing apparatus 2 and the terminal device 3 may be connected to each other through the communication path 4 using a cable, via wireless data communication such as Wi-Fi (registered trademark), or using the G3 communication standard.

The image processing apparatus 2 and the terminal device 3 may also be connected to each other via a communication path different from the communication path 4. For example, the different communication path is a communication path different from a network such as a LAN or WAN, and may be a peer to peer (P2P) communication path for directly connecting the image processing apparatus 2 to the terminal device 3. For example, the different communication path may be an infrared or radio communication path. Specifically, the different communication path may be implemented by wireless data communication or data communication based on IC cards. Examples of the wireless data communication include infrared wireless data communication, known as Infrared Data Association (IrDA), and Bluetooth (registered trademark). Examples of the data communication based on IC cards include data communication based on contactless IC cards such as Felica (registered trademark). When the different communication path is used, the image processing apparatus 2 and the terminal device 3 may be connected to each other via two communication paths, that is, the communication path 4 and the different communication path.

Next, the image processing apparatus 2 will be described. As an example, the image processing apparatus 2 include the image reading unit 21, the printing unit 22, the facsimile transmission unit 23, a user interface (UI) providing unit 24, a controller 25, a transmitting and receiving unit 26, a storage unit 27, and a UI unit 28.

Image Reading Unit 21, Printing Unit 22, and Facsimile Transmission Unit 23

The image reading unit 21 reads an image on an original document to generate input-output data representing the image, and stores the input-output data in the storage unit 27 under control of the controller 25. The printing unit 22 receives the input-output data stored in the storage unit 27, and prints the image on a sheet in accordance with the input-output data under control of the controller 25. The facsimile transmission unit 23 receives the input-output data stored in the storage unit 27, and transmits the image via facsimile in accordance with the input-output data under control of the controller 25. The image processing apparatus 2 may not necessarily include all the image reading unit 21, the printing unit 22, and the facsimile transmission unit 23, and may include at least one of the image reading unit 21, the printing unit 22, and the facsimile transmission unit 23.

UI Providing Unit 24

The UI providing unit 24 of the image processing apparatus 2 creates data of a user interface (UI) for performing setting about the functions (image processing) of the image processing apparatus 2 using the terminal device 3. For example, the UI providing unit 24 creates data of a user interface for setting, using the terminal device 3, the operating conditions of the image reading unit 21, the printing unit 22, or the facsimile transmission unit 23. The UI providing unit 24 creates data of a user interface corresponding to a UI unit 34 of the terminal device 3. In the following description, a user interface for setting the operating conditions for the functions of the image processing apparatus 2 may be referred to as a "setting user interface". For example, the UI providing unit 24 creates hypertext markup language (HTML) data of a setting user interface in order to display the setting user interface on a web browser. The UI providing unit 24 may create HTML data of a setting user interface using an object-oriented programming language such as JavaScript (registered trademark). The UI providing unit 24 may also create data of a setting user interface as a Flash (registered trademark) application to create data of a setting user interface including sound and moving images or animation. The UI providing unit 24 further creates connection information used to allow the terminal device 3 to access the data of the setting user interface created by the UI providing unit 24 via the communication path 4. The connection information may be address data by which the terminal device 3 accesses the data of the setting user interface created by the UI providing unit 24. The address data may be, for example, Uniform Resource Locator (URL). When the terminal device 3 is connected to the image processing apparatus 2 via the communication path 4, the UI providing unit 24 provides the UI unit 34 of the terminal device 3 with data of the setting user interface via the communication path 4. The data of the setting user interface may be stored in the storage unit 27. Further, the UI providing unit 24 may create data of a user interface for setting the operating conditions described above on the UI unit 28 of the image processing apparatus 2, and may provide the UI unit 28 with the created data of the user interface. In a case where the UI providing unit 24 of the image processing apparatus 2 provides the terminal device 3 with address data, HTML data for setting the operating conditions described above is generated at the location of the URL provided by a web server included in the UI providing unit 24. The terminal device 3 accesses the URL defined by the received address data, and therefore the user interface may be displayed on and the operating conditions may be set on the web browser of the terminal device 3.

Controller 25

The controller 25 of the image processing apparatus 2 controls the operations of the respective units of the image processing apparatus 2. For example, the controller 25 receives request information indicating a request for specific information and operation state information indicating the state of the operation of the terminal device 3 from the terminal device 3 via the transmitting and receiving unit 26. The controller 25 detects the state of the operation of the terminal device 3 based on the operation state information, and provides the terminal device 3 with one or plural pieces of specific information relating to the state of the operation. When providing the terminal device 3 with plural pieces of specific information, the controller 25 provides the terminal device 3 with plural pieces of specific information, which are assigned priories in accordance with the state of the operation, in descending order of priority. For example, if it is determined, on the basis of the operation state information, that the terminal device 3 is in the state of a specific operation relating to image processing, the controller 25 provides the terminal device 3 with specific information relating to one or plural image processing operations that are expected to be executed after the specific operation. When providing the terminal device 3 with plural pieces of specific information, the controller 25 provides the terminal device 3 with plural pieces of specific information relating to the plural image processing operations, which are assigned priorities in accordance with the state of the operations, in descending order of priority. In the following description, the state of the operation may be referred to as the "operation state". The operation state and the specific information will be described.

State of Operation of Terminal Device 3

First, a description will be made of the operation state of the terminal device 3. As an example, the operation state of the terminal device 3 may be defined as the type of application software operating on the terminal device 3 or the operation being performed using the application software operating on the terminal device 3.

An example of the operation state will be described with reference to FIG. 2. FIG. 2 illustrates examples of the definitions of operation states of the terminal device 3. The operation state of the terminal device 3 is assigned levels in accordance with accuracy. For example, in level A, the type of the application software operating on the terminal device 3 corresponds to the operation state of the terminal device 3. The operation state has values corresponding to "viewer", "data management application", "email software", "address book", etc. The "viewer" represents, for example, application software for allowing an image to be displayed on a display device. The "data management application" represents data management application software for managing files and folders. A file is a collection of pieces of data, and may also be referred to as a data set. A folder is a location where files are classified and managed in a storage device, and may also be referred to as a directory. The "email software" represents email application software for transmitting and receiving emails. The "address book" represents application software for managing numbers representing the addresses of emails, telephone numbers, or facsimile transmission numbers. For example, a map in which operation states are associated with application software names is created in advance, and the value of the operation state corresponding to the application software operating on the terminal device 3 may be obtained on the basis of the name of the operating application software and the map.

Further, for example, in level B, the content of the operation being performed using the application software operating on the terminal device 3 corresponds to the operation state of the terminal device 3. For example, map application software for allowing a map to be displayed on the display device is operating on the terminal device 3. In this case, if a map of the area XXX is being displayed on the UI unit 34 of the terminal device 3, the content that "a map of the area XXX is being displayed" corresponds to the value of the operation state. In addition, authoring application software for editing data such as image and audio data is operating on the terminal device 3. In this case, if an image is being displayed on the UI unit 34 of the terminal device 3, the content that "an image is opening" corresponds to the value of the operation state.

An operation state acquisition unit 32 of the terminal device 3, which will be described below, acquires the operation state of the terminal device 3 in accordance with the standard of level A or the standard of level B. Further, the terminal device 3 transmits request information indicating a request for specific information and operation state information indicating the operation state to the image processing apparatus 2, and the controller 25 of the image processing apparatus 2 receives the request information and the operation state information.

An example of the operation state information transmitted from the terminal device 3 will be described with reference to FIG. 3. FIG. 3 illustrates examples of operation states of the terminal device 3. For example, application software regarding a viewer is operating on the terminal device 3. In this case, if a file is being displayed on the UI unit 34 of the terminal device 3, the content that "a file is being displayed" corresponds to the value of the operation state. In this case, operation state information indicating that "a file is being displayed" is transmitted from the terminal device 3 to the image processing apparatus 2. In addition, data management application software is operating on the terminal device 3. In this case, if a folder is being displayed on the UI unit 34 of the terminal device 3, the content that "a folder is being displayed" corresponds to the value of the operation state. In this case, operation state information indicating that "a folder is being displayed" is transmitted from the terminal device 3 to the image processing apparatus 2. In addition, email application software is operating on the terminal device 3. In this case, if a user is creating an email, the content that "an email is being created" corresponds to the value of the operation state. In this case, operation state information indicating that "an email is being created" is transmitted from the terminal device 3 to the image processing apparatus 2. In addition, application software regarding an address book is operating on the terminal device 3. In this case, if the address of an email or a telephone number is being displayed on the UI unit 34 of the terminal device 3, the content that "a destination is being displayed" corresponds to the value of the operation state. In this case, operation state information indicating that "a destination is being displayed" is transmitted from the terminal device 3 to the image processing apparatus 2.

Specific Information Provided from Image Processing Apparatus 2 to Terminal Device 3

Next, a description will be made of specific information provided from the image processing apparatus 2 to the terminal device 3. The specific information may be, for example, data of a setting user interface for setting the operating conditions of the functions (image processing) of the image processing apparatus 2 on the terminal device 3, or address data of the setting user interface. More specifically, the specific information may be data of a setting user interface for setting, on the terminal device 3, the operating conditions of the functions of the image processing apparatus 2 that are expected to be executed in association with the operation state of the terminal device 3, or address data of the setting user interface. For example, the controller 25 selects plural functions of the image processing apparatus 2, which are assigned priorities in accordance with the operation state of the terminal device 3, and provides the terminal device 3 with pieces of data of setting user interfaces for setting the operating conditions of the individual functions, or with pieces of address data of the respective setting user interfaces in descending order of priority.

Examples of the functions of the image processing apparatus 2 include an image reading function performed by the image reading unit 21, a printing function performed by the printing unit 22, and a facsimile transmission function performed by the facsimile transmission unit 23. The controller 25 provides the terminal device 3 with data of a setting user interface for setting the operating conditions of the image reading unit 21, the printing unit 22, or the facsimile transmission unit 23, or with address data of the setting user interface in descending order of priority.

The priority of each individual function represents, for example, how probable it is that the function will be executed after the operation being performed by the terminal device 3 is completed. That is, a function having a relatively high probability of being executed after the operation being performed by the terminal device 3 is completed is assigned a relatively high priority, and a function having a relatively low probability of being executed after the operation being performed by the terminal device 3 is completed is assigned a relatively low priority. The priority of each individual function may be determined in advance on the basis of, for example, the frequency with which the function has been executed in the past. The controller 25 selects plural functions that are expected to be executed after the operation of the terminal device 3 is completed, in association with the operation of the terminal device 3, and provides the terminal device 3 with pieces of data of setting user interfaces for setting the operating conditions of the individual functions, or with pieces of address data of the respective setting user interfaces in descending order from the function having the highest probability of being executed (i.e., in descending order of priority).

The functions of the image processing apparatus 2 that are associated with operation states will be described with reference to FIG. 4. FIG. 4 illustrates examples of functions associated with operation states. For example, if the operation state of the terminal device 3 indicates that "a file is being displayed", the highest probability is that the function "(1) Printing from Terminal device" will be executed after the display of the file has been completed, the second highest probability is that the function "(2) Facsimile transmission from Terminal device" will be executed after the display of the file has been completed, and the third highest probability is that the function "(3) Display of a list of functions" will be executed after the display of the file has been completed. Here, the function "(1) Printing from Terminal device" is a function for executing a series of processes for transmitting, by using the terminal device 3, input-output data of a file being displayed on the terminal device 3 to the image processing apparatus 2 and printing, by using the printing unit 22, an image on a sheet in accordance with the input-output data. The function "(2) Facsimile transmission from Terminal device" is a function for executing a series of processes for transmitting, by using the terminal device 3, input-output data of a file being displayed on the terminal device 3 to the image processing apparatus 2 and transmitting, by using the facsimile transmission unit 23, an image based on the input-output data to a destination specified by the terminal device 3 via facsimile. The function "(3) Display of a list of functions" is a function for displaying a list of functions of the image processing apparatus 2 on the terminal device 3.

For example, if it is determined, on the basis of the operation state information, that the operation state of the terminal device 3 indicates that "a file is being displayed", the controller 25 firstly provides the terminal device 3 with address data of a setting user interface for setting the operating conditions of the highest priority function "(1) Printing from Terminal device". Further, the controller 25 secondly provides the terminal device 3 with address data of a setting user interface for setting the operating conditions of the second highest priority function "(2) Facsimile transmission from Terminal device". Further, the controller 25 thirdly provides the terminal device 3 with address data of a setting user interface for setting the third highest priority function "(3) Display of a list of functions".

For example, if the operation state of the terminal device 3 indicates that "a folder is being displayed", the highest probability is that the function "(1) Scanning to Terminal device" will be executed after the display of the folder has been completed, the second highest probability is that the function "(2) Acquisition of box document to Terminal device" will be executed after the display of the folder has been completed, and the third highest probability is that the function "(3) Display of a list of functions" will be executed after the display of the folder has been completed. Here, the function "(1) Scanning to Terminal device" is a function for executing a series of processes for reading, by using the image reading unit 21, an image on an original document to generate input-output data indicating the image, and transmitting, by using the image processing apparatus 2, the input-output data to the terminal device 3. The function "box operation" relating to the function "(2) Acquisition of box document to Terminal device" includes a function for saving input-output data in the storage unit 27 of the image processing apparatus 2, and a function for acquiring the input-output data from the storage unit 27 of the image processing apparatus 2. The function "(2) Acquisition of box document to Terminal device" is a function for transmitting, by using the image processing apparatus 2, the input-output data stored in the storage unit 27 to the terminal device 3 and acquiring, by using the terminal device 3, the input-output data.

For example, if it is determined, on the basis of the operation state information, that the operation state of the terminal device 3 indicates that "a folder is being displayed", the controller 25 firstly provides the terminal device 3 with address data of a setting user interface for setting the operating conditions of the highest priority function "(1) Scanning to Terminal device". Further, the controller 25 secondly provides the terminal device 3 with address data of a setting user interface for setting the operating conditions of the second highest priority function "(2) Acquisition of box document to Terminal device". Further, the controller 25 thirdly provides the terminal device 3 with address data of a setting user interface for setting the third highest priority function "(3) Display of a list of functions".

For example, if the operation state of the terminal device 3 indicates that "an email is being created", the highest probability is that the function "(1) Scanning to Terminal device" will be executed after the creation of the email has been completed, the second highest probability is that the function "(2) Acquisition of box document to Terminal device" will be executed after the creation of the email has been completed, and the third highest probability is that the function "(3) Display of a list of functions" will be executed after the creation of the email has been completed.

For example, if it is determined, on the basis of the operation state information, that the operation state of the terminal device 3 indicates that "an email is being created", the controller 25 firstly provides the terminal device 3 with address data of a setting user interface for setting the operating conditions of the highest priority function "(1) Scanning to Terminal device". Further, the controller 25 secondly provides the terminal device 3 with address data of a setting user interface for setting the operating conditions of the second highest priority function "(2) Acquisition of box document to Terminal device". Further, the controller 25 thirdly provides the terminal device 3 with address data of a setting user interface for setting the third highest priority function "(3) Display of a list of functions".

For example, if the operation state of the terminal device 3 indicates that "a destination is being displayed", the highest probability is that the function "(1) Scanning to Email" will be executed after the display of the destination has been completed, the second highest probability is that the function "(2) Scanning to Facsimile transmission" will be executed after the display of the destination has been completed, and the third highest probability is that the function "(3) Display of a list of functions" will be executed after the display of the destination has been completed. Here, the function "(1) Scanning to Email" is a function for executing a series of processes for reading, by using the image reading unit 21, an image on an original document to generate input-output data indicating the image, and transmitting, by using the image processing apparatus 2, the input-output data to the address specified by the terminal device 3 via email. The function "(2) Scanning to Facsimile transmission" is a function for executing a series of processes for reading, by using the image reading unit 21, an image on an original document to generate input-output data indicating the image, and transmitting, by using the facsimile transmission unit 23, an image based on the input-output data to the destination specified by the terminal device 3 via facsimile.

For example, if it is determined, on the basis of the operation state information, that the operation state of the terminal device 3 indicates that "a destination is being displayed", the controller 25 firstly provides the terminal device 3 with address data of a setting user interface for setting the operating conditions of the highest priority function "(1) Scanning to Email". Further, the controller 25 secondly provides the terminal device 3 with address data of a setting user interface for setting the operating conditions of the second highest priority function "(2) Scanning to Facsimile transmission". Further, the controller 25 thirdly provides the terminal device 3 with address data of a setting user interface for setting the third highest priority function "(3) Display of a list of functions".

Correspondence relationship information indicating correspondence relationships between individual functions assigned priorities and operation states is created in advance, and is stored in advance in, for example, the storage unit 27. As an example, information indicating the correspondence relationships illustrated in FIG. 4 is created in advance, and is stored in advance in the storage unit 27. The priorities of the individual functions to be executed in accordance with the operation states illustrated in FIG. 4 may be determined on the basis of, for example, the frequency with which each function was executed in the past. The controller 25 refers to the correspondence relationship information stored in the storage unit 27 to select plural functions, which are assigned priorities in accordance with the operation states of the terminal device 3, and provides the terminal device 3 with pieces of address data of setting user interfaces for setting the operating conditions of the selected functions, in descending order of priority.

Instead of providing the terminal device 3 with pieces of address data of plural setting user interfaces in descending order of priority, the controller 25 may provide the terminal device 3 with pieces of data of plural setting user interfaces in descending order of priority. That is, upon receipt of a request for specific information from the terminal device 3, the controller 25 may provide the terminal device 3 with pieces of data of plural setting user interfaces in descending order of priority without providing the terminal device 3 with pieces of address data of the setting user interfaces. The controller 25 may also provide the terminal device 3 with only the highest priority specific information. The controller 25 may also collectively provide the terminal device 3 with pieces of data or pieces of address data of plural setting user interfaces together with information regarding the priorities corresponding to the pieces of data or pieces of address data of the respective setting user interfaces. In this case, the terminal device 3 interprets the information regarding the priorities assigned to the pieces of data or pieces of address data of the respective setting user interfaces, and performs control to display a screen of a setting user interface in accordance with the priorities.

The controller 25 receives control data (command data) transmitted from the terminal device 3, and controls the operation of the image reading unit 21, the printing unit 22, or the facsimile transmission unit 23 in accordance with the control data. The control data may be data indicating a command for image processing to be performed by the image processing apparatus 2, and may be, as an example, data indicating the operating conditions for reading an image, printing an image, or transmitting an image via facsimile. The control data includes, for example, the following information: The control data includes information indicating a function selected by a user from among an image reading function, a printing function, and a facsimile transmission function. In a case where an image is read by the image reading unit 21, the control data includes information regarding image reading conditions such as resolution, density, monochrome/color selection, the size original document, and the file name of read image data. In a case where printing is performed by the printing unit 22, the control data includes information regarding printing conditions such as resolution, density, monochrome/color selection, paper size, the number of copies to be printed, and the file name of data to be printed. In a case where facsimile transmission is performed by the facsimile transmission unit 23, the control data includes information regarding facsimile transmission conditions such as resolution, density, the telephone number of the transmission destination, and the file name of data to be transmitted. For example, the controller 25 receives a hypertext transfer protocol (HTTP) request transmitted from the terminal device 3, analyzes the content of the request, and controls the operation of the image reading unit 21, the printing unit 22, or the facsimile transmission unit 23.

Transmitting and Receiving Unit 26

The transmitting and receiving unit 26 of the image processing apparatus 2 receives request information indicating a request for specific information and operation state information indicating the operation state of the terminal device 3 from the terminal device 3 via the communication path 4, and outputs the request information and the operation state information to the controller 25.

Further, the transmitting and receiving unit 26 transmits address data by which the terminal device 3 accesses data of a setting user interface via the communication path 4 to the terminal device 3 via the communication path 4. For example, in the connection of the image processing apparatus 2 to a LAN, the transmitting and receiving unit 26 transmits address data of the setting user interface in the LAN to the terminal device 3 via the communication path 4. In the connection of the image processing apparatus 2 to a WAN, the transmitting and receiving unit 26 transmits address data of the setting user interface in the WAN to the terminal device 3 via the communication path 4.

The transmitting and receiving unit 26 further transmits data of the setting user interface to the terminal device 3 via the communication path 4. Specifically, when the terminal device 3 accesses data of the setting user interface via the communication path 4 using the address data transmitted from the image processing apparatus 2, the transmitting and receiving unit 26 transmits the data of the setting user interface to the terminal device 3 via the communication path 4.

The transmitting and receiving unit 26 transmits pieces of address data of plural setting user interfaces to the terminal device 3 via the communication path 4 in descending order of priority under control of the controller 25. Alternatively, instead of transmitting pieces of address data of plural setting user interfaces to the terminal device 3 in descending order of priority, the transmitting and receiving unit 26 may transmit pieces of data of the plural setting user interfaces to the terminal device 3 in descending order of priority under control of the controller 25.

In addition, if the image reading unit 21 has read an image and generated input-output data in accordance with an instruction from the terminal device 3, the transmitting and receiving unit 26 transmits the input-output data generated by the image reading unit 21 to the terminal device 3 via the communication path 4. Further, the transmitting and receiving unit 26 receives data to be printed by the printing unit 22 or data to be transmitted from the facsimile transmission unit 23 and control data (command data) to the terminal device 3 via the communication path 4. Specifically, the transmitting and receiving unit 26 receives, as an HTTP request, control data from the terminal device 3 via the communication path 4. In a case where printing or facsimile transmission is performed by the image processing apparatus 2, the transmitting and receiving unit 26 receives input-output data to be printed or transmitted via facsimile from the terminal device 3 via the communication path 4. In a case where an image is read by the image processing apparatus 2, the transmitting and receiving unit 26 transmits input-output data generated by the image reading unit 21 to the terminal device 3 via the communication path 4 as an HTTP response to the HTTP request.

The image processing apparatus 2 and the terminal device 3 may be connected to each other via two communication paths, that is, the communication path 4 and the different communication path described above. For example, the transmitting and receiving unit 26 receives the request information and the operation state information from the terminal device 3 via the different communication path. Further, the transmitting and receiving unit 26 transmits address data of a setting user interface to the terminal device 3 via the different communication path. For example, if a communication path based on wireless data communication such as IrDA or Bluetooth (registered trademark) is used as the different communication path, the transmitting and receiving unit 26 communicates with a transmitting and receiving unit 33 of the terminal device 3 through infrared or radio communication with the transmitting and receiving unit 33, and receives the request information and the operation state information from the transmitting and receiving unit 33 via the different communication path. Further, the transmitting and receiving unit 26 transmits pieces of address data of plural setting user interfaces to the transmitting and receiving unit 33 via the different communication path in descending order of priority. When the transmitting and receiving unit 33 of the terminal device 3 accesses data of a setting user interface via the communication path 4 using the address data transmitted from the image processing apparatus 2, the transmitting and receiving unit 26 transmits the data of the setting user interface to the terminal device 3 via the communication path 4.

In this manner, the terminal device 3 may transmit the request information and the operation state information to the image processing apparatus 2 via a communication path different from the communication path 4, and the image processing apparatus 2 may transmit pieces of address data of plural setting user interface to the terminal device 3 via the different communication path in descending order of priority and may transmit pieces of data of the setting user interface to the terminal device 3 via the communication path 4.

Storage Unit 27

The storage unit 27 of the image processing apparatus 2 stores correspondence relationship information indicating correspondence relationships between plural pieces of specific information assigned priorities and operation states of the terminal device 3. As an example, the storage unit 27 stores correspondence relationship information indicating correspondence relationships between functions of the image processing apparatus 2 that are assigned priorities and operation states of the terminal device 3. The storage unit 27 stores, for example, the correspondence relationship information illustrated in FIG. 4. The storage unit 27 also stores the input-output data generated by the image reading unit 21. The storage unit 27 also stores data to be printed, which has been transmitted from the terminal device 3, data to be transmitted via facsimile, and control data (command data).

UI Unit 28

The UI unit 28 of the image processing apparatus 2 has a display, and displays, for example, a user interface provided from the UI providing unit 24. The UI unit 28 receives control data regarding the operating conditions of the image reading unit 21, the printing unit 22, or the facsimile transmission unit 23, which has been input by a user.

Next, the terminal device 3 will be described. As an example, the terminal device 3 includes a controller 31, the operation state acquisition unit 32, the transmitting and receiving unit 33, the UI unit 34, and the storage unit 35.

Controller 31

The controller 31 of the terminal device 3 executes application software specified by a user. For example, the controller 31 executes application software including application software regarding a viewer for allowing an image to be displayed on the UI unit 34, data management application software for managing files and folders, email application software for transmitting and receiving emails, application software regarding an address book for managing the addresses of emails, telephone numbers, or the like, map application software for allowing a map to be displayed on the UI unit 34, and authoring application software for editing data such as image data and audio data. The application software described above may be stored in advance in, for example, the storage unit 35, or may be transmitted from an external device to the terminal device 3 via communication or the like.

Upon receipt of an instruction from the user for acquiring specific information relating to the operation being operated by the terminal device 3, the controller 31 requests the operation state acquisition unit 32 to acquire the specific information. For example, the controller 31 requests the operation state acquisition unit 32 to acquire data of a setting user interface for setting the operating conditions of each individual function of the image processing apparatus 2 on the terminal device 3.

Operation State Acquisition Unit 32

The operation state acquisition unit 32 of the terminal device 3 acquires the state of the operation being performed by the terminal device 3. For example, the operation state acquisition unit 32 acquires, as an operation state, the type of the application software operating on the controller 31 or the operation being performed using the operating application software.

For example, if operation states are defined on the basis of the level A illustrated in FIG. 2, a map in which the values of the operation states illustrated in FIG. 2 and the names of application software are associated with each other is created in advance, and is stored in advance in the storage unit 35. The operation state acquisition unit 32 acquires the name of the application software operating on the terminal device 3 from the controller 31, and refers to the map described above to acquire the value of the operation state corresponding to the operating application software. For example, if application software regarding a viewer is being executed by the controller 31, the operation state acquisition unit 32 acquires the name of the application software regarding the viewer from the controller 31, and refers to the map to acquire the value (viewer) of the operation state. If data management application software for managing files and folders is being executed by the controller 31, the operation state acquisition unit 32 acquires the name of the data management application software from the controller 31, and refers to the map described above to acquire the value (data management application) of the operation state.

If operation states are defined on the basis of the level B illustrated in FIG. 2, the controller 31 outputs to the operation state acquisition unit 32 operation state information indicating the operation being performed by the controller 31 using the application software operating on the terminal device 3, and the operation state acquisition unit 32 acquires an operation state. For example, map application software is being executed by the controller 31. In this case, if a map of the area XXX is being displayed on the UI unit 34, the controller 31 outputs to the operation state acquisition unit 32 operation state information indicating that "a map of the area XXX is being displayed". In addition, authoring application software is being executed by the controller 31. In this case, if an image is being displayed on the UI unit 34, the controller 31 outputs to the operation state acquisition unit 32 operation state information indicating that "an image is being displayed".

As an example, the operation state acquisition unit 32 may acquire an operation state of the terminal device 3 in accordance with the standard of the level A or the standard of the level B.

The operation state acquisition unit 32 outputs to the transmitting and receiving unit 33 request information indicating a request for specific information and operation state information indicating the operation state. The operation state acquisition unit 32 may add the operation state information to the request information, and output resulting information to the transmitting and receiving unit 33.

Transmitting and Receiving Unit 33

The transmitting and receiving unit 33 of the terminal device 3 transmits request information indicating a request for specific information and operation state information indicating the operation state of the terminal device 3 to the image processing apparatus 2 via the communication path 4.

Further, the transmitting and receiving unit 33 receives address data of a setting user interface from the image processing apparatus 2 via the communication path 4. Since pieces of address data of plural setting user interfaces are transmitted from the image processing apparatus 2 in descending order of priority in accordance with the operation state of the terminal device 3, the transmitting and receiving unit 33 sequentially receives the pieces of address data. The pieces of address data received by the transmitting and receiving unit 33 are stored in the storage unit 35 of the terminal device 3.

The transmitting and receiving unit 33 further receives data of a setting user interface from the image processing apparatus 2 via the communication path 4. Specifically, a user activates a web browser on the terminal device 3. A program for the web browser is stored in advance in the storage unit 35. When a user gives an instruction for activating a web browser using the UI unit 34, the controller 31 activates the web browser in accordance with the instruction from the user. Then, the transmitting and receiving unit 33 accesses the data of the setting user interface via the communication path 4 using the address data specified by the user. After that, the data of the setting user interface is provided from the UI providing unit 24 of the image processing apparatus 2 to the UI unit 34 of the terminal device 3 through the transmitting and receiving unit 26 of the image processing apparatus 2, the communication path 4, and the transmitting and receiving unit 33 of the terminal device 3. The web browser of the terminal device 3 displays the setting user interface received from the image processing apparatus 2. If the transmitting and receiving unit 33 receives address data from the image processing apparatus 2, the controller 31 may automatically activate the web browser without waiting for an instruction from the user, and the transmitting and receiving unit 33 may access the data of the setting user interface via the communication path 4 using the address data. For example, the transmitting and receiving unit 33 may access the data of the setting user interface via the communication path 4 using the highest priority address data without waiting for an instruction from the user.

Further, the transmitting and receiving unit 33 transmits data to be printed by the printing unit 22 of the image processing apparatus 2, data to be transmitted by the facsimile transmission unit 23 of the image processing apparatus 2, and control data (command data) to the image processing apparatus 2 via the communication path 4. If the image reading unit 21 has read an image and generated input-output data in accordance with an instruction from the terminal device 3, the transmitting and receiving unit 33 receives the input-output data generated by the image reading unit 21 from the image processing apparatus 2 via the communication path 4.

For example, a user inputs, through the setting user interface displayed on the UI unit 34, control data (command data) regarding the operating conditions of the image reading unit 21, the printing unit 22, or the facsimile transmission unit 23. The transmitting and receiving unit 33 transmits, as an HTTP request, the control data to the image processing apparatus 2 via the communication path 4. If printing or facsimile transmission is to be performed by the image processing apparatus 2, the transmitting and receiving unit 33 transmits the data to be printed or transmitted via facsimile to the image processing apparatus 2 via the communication path 4. The data to be printed or transmitted via facsimile is specified by a user using the UI unit 34. If an image is to be read by the image processing apparatus 2, the transmitting and receiving unit 33 receives input-output data generated by the image reading unit 21 from the image processing apparatus 2 via the communication path 4 as an HTTP response to the HTTP request.

Furthermore, as described above, if the image processing apparatus 2 and the terminal device 3 are connected to each other via two communication paths, that is, the communication path 4 and the different communication path described above, the transmitting and receiving unit 33 transmits the request information and the operation state information to the image processing apparatus 2 via the different communication path, and receives address data of a setting user interface from the image processing apparatus 2 via the different communication path. The transmitting and receiving unit 33 receives pieces of address data of plural setting user interfaces from the transmitting and receiving unit 26 via the different communication path in descending order of priority.

UI Unit 34

The UI unit 34 of the terminal device 3 has a display, and displays plural pieces of specific information. For example, the UI unit 34 displays pieces of address data of plural setting user interfaces transmitted from the image processing apparatus 2. The UI unit 34 may display the pieces of address data in list form, or may display the pieces of address data in descending order of priority in accordance with the operation state. For example, the UI unit 34 may display the pieces of address data as thumbnail images (small images), or may display the pieces of address data in descending order of priority in accordance with an instruction from the user. The UI unit 34 further displays a setting user interface.

Further, the UI unit 34 receives an instruction from the user for acquiring specific information and address data specified by a user. For example, a user specifies, using the UI unit 34, address data of a setting user interface for setting the operating condition of a function (image processing) to be executed by the user among plural pieces of address data being displayed on the UI unit 34. The UI unit 34 further receives the control data regarding the operating conditions of the image reading unit 21, the printing unit 22, or the facsimile transmission unit 23 of the image processing apparatus 2, which has been input by a user. The UI unit 34 may display an image represented by input-output data generated by the image reading unit 21 of the image processing apparatus 2.

Storage Unit 35

The storage unit 35 of the terminal device 3 stores input-output data. For example, the storage unit 35 stores input-output data generated by the image reading unit 21 of the image processing apparatus 2, and input-output data to be printed or transmitted via facsimile from the image processing apparatus 2. The storage unit 35 also stores application software to be executed by the controller 31. The storage unit 35 further stores pieces of address data of plural setting user interfaces transmitted from the image processing apparatus 2.

Next, the operation of the image processing system 1 and an example of how a user uses the image processing system 1 will be described with reference to FIG. 5. FIG. 5 is a sequence diagram illustrating an example of the procedure of a process performed by the image processing system 1.

First, when a user gives an instruction using the UI unit 34 of the terminal device 3 for activating specific application software, the controller 31 of the terminal device 3 activates the application software specified by the user. The user uses the activated application software to create a document, display a file such as an image file or a document file on the UI unit 34, or display a folder on the UI unit 34.

Figure 6:
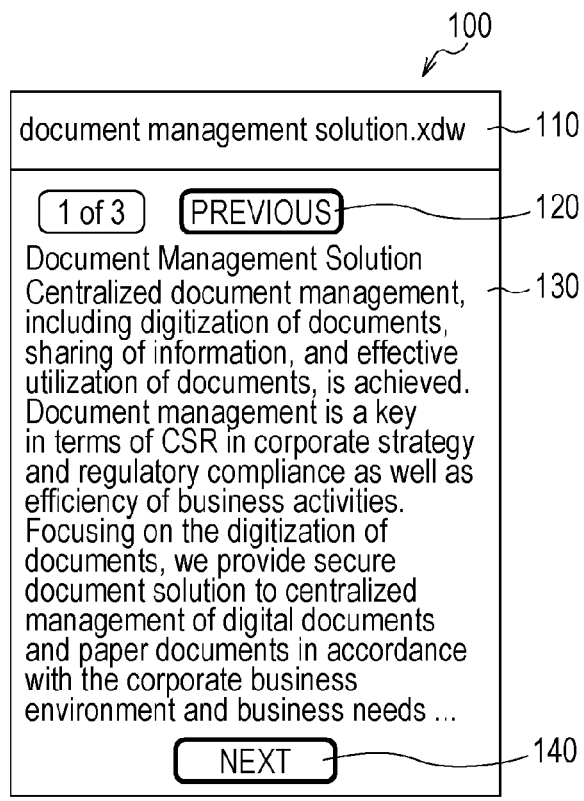
FIG. 6 illustrates an example of a user interface corresponding to an operation state.
Figure 7:
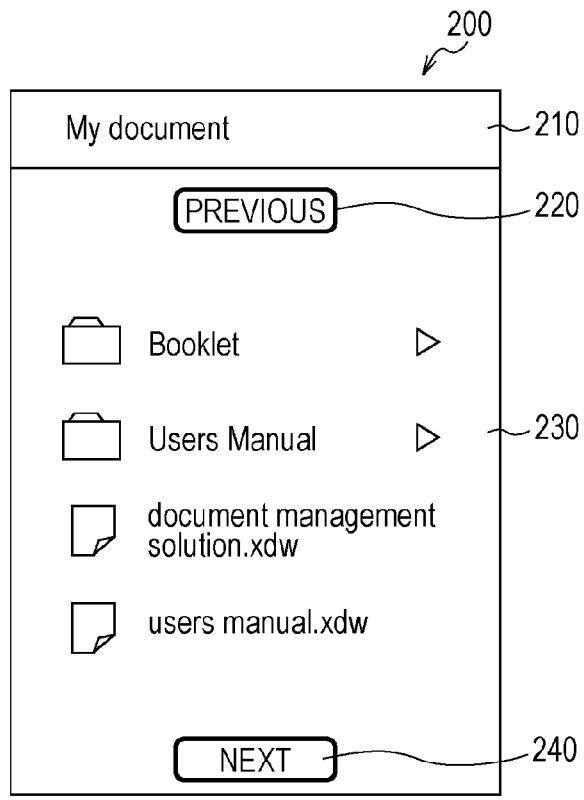
FIG. 7 illustrates an example of a user interface corresponding to an operation state.

FIGS. 6 and 7 illustrate an example of the user interface to be displayed on the UI unit 34. FIGS. 6 and 7 illustrate an example of a user interface corresponding to an operation state.

FIG. 6 illustrates an example of the file to be displayed on the UI unit 34 of the terminal device 3. For example, the controller 31 activates document creation application software, and a user creates and edits a document using the UI unit 34. A user interface 100 displayed on the UI unit 34 includes, as an example, a display area 110 where the name of a document is displayed, scroll operation portions 120 and 140 used to scroll the document to move to another page, and a display area 130 in which the content of the document is displayed.

FIG. 7 illustrates an example of the folder to be displayed on the UI unit 34 of the terminal device 3. For example, the controller 31 activates data management application software, and a user specifies a folder or file using the UI unit 34. A user interface 200 displayed on the UI unit 34 includes, as an example, a display area 210 in which the name of a folder is displayed, scroll operation portions 220 and 240 used to display another folder, and a display area 230 in which data in the folder or a sub-folder in the folder is displayed.

The user gives an instruction using the UI unit 34 of the terminal device 3 for acquiring specific information regarding an operation (step S01). Information indicating the instruction for acquiring the specific information is output from the UI unit 34 to the controller 31. The controller 31 requests the operation state acquisition unit 32 to acquire the specific information (step S02).

The operation state acquisition unit 32 acquires the state of the operation being performed by the terminal device 3 (step S03). For example, as illustrated in FIG. 6, if a file is being displayed on the UI unit 34, the controller 31 outputs operation state information indicating that "a file is being displayed" to the operation state acquisition unit 32, and the operation state acquisition unit 32 acquires the operation state of the terminal device 3. As illustrated in FIG. 7, if a folder is being displayed on the UI unit 34, the controller 31 outputs operation state information indicating that "a folder is being displayed" to the operation state acquisition unit 32, and the operation state acquisition unit 32 acquires the operation state of the terminal device 3. The operation state acquisition unit 32 outputs the request information and the operation state information to the transmitting and receiving unit 33.

The transmitting and receiving unit 33 of the terminal device 3 transmits the request information and the operation state information to the image processing apparatus 2 via the communication path 4 (step S04). Alternatively, the transmitting and receiving unit 33 may transmit the request information and the operation state information to the image processing apparatus 2 via a communication path different from the communication path 4. The transmitting and receiving unit 26 of the image processing apparatus 2 receives the request information and the operation state information from the terminal device 3 via the communication path 4 or the different communication path, and outputs the request information and the operation state information to the controller 25.

The controller 25 selects plural pieces of specific information, which are assigned priorities in accordance with the operation state indicated by the operation state information (step S05). For example, the controller 25 refers to the correspondence relationship information illustrated in FIG. 4, and selects plural functions, which are assigned priorities in accordance with the operation state. For example, if it is determined, on the basis of the operation state information, that the operation state of the terminal device 3 indicates that "a file is being displayed", the controller 25 selects the function "(1) Printing from Terminal device" as the highest priority function, selects the function "(2) Facsimile transmission from Terminal device" as the second highest priority function, and selects the function "(3) Display of a list of functions" as the third highest priority function. Then, the controller 25 outputs address data of a setting user interface for setting the operating conditions of each function to the transmitting and receiving unit 26.

The transmitting and receiving unit 26 transmits specific information having the highest priority (top priority) to the terminal device 3 via the communication path 4 or the different communication path (step S06). For example, the transmitting and receiving unit 26 firstly transmits address data of a setting user interface for setting the operating conditions of the function "(1) Printing from Terminal device" to the terminal device 3. Further, the transmitting and receiving unit 26 transmits specific information having the second highest priority to the terminal device 3 via the communication path 4 or the different communication path (step S07). For example, the transmitting and receiving unit 26 secondly transmits address data of a setting user interface for setting the operating conditions of the function "(2) Facsimile transmission from Terminal device" to the terminal device 3. Then, the transmitting and receiving unit 26 transmits specific information having the N-th highest priority to the terminal device 3 via the communication path 4 or the different communication path (step S08). Accordingly, the transmitting and receiving unit 26 transmits plural pieces of specific information selected by the controller 25 to the terminal device 3 in descending order of priority.

The transmitting and receiving unit 33 of the terminal device 3 receives the plural pieces of specific information from the image processing apparatus 2 via the communication path 4 or the different communication path, and outputs the plural pieces of specific information assigned the priorities to the controller 31 (step S09). For example, the transmitting and receiving unit 33 receives pieces of address data of the plural setting user interfaces assigned the priorities from the image processing apparatus 2 via the communication path 4 or the different communication path, and outputs the pieces of address data assigned the priorities to the controller 31.

The controller 31 causes the pieces of specific information acquired from the image processing apparatus 2 to be displayed on the UI unit 34 (step S10). For example, the controller 31 may cause the pieces of address data to be displayed as thumbnail images on the UI unit 34, or may cause the pieces of address data to be displayed on the UI unit 34 in descending order of priority.

Then, the user activates a web browser on the terminal device 3, and specifies a desired piece of address data among the pieces of address data being displayed on the UI unit 34 using the UI unit 34. The transmitting and receiving unit 33 accesses data of a setting user interface via the communication path 4 using the address data specified by the user. After that, the data of the setting user interface is provided from the UI providing unit 24 of the image processing apparatus 2 to the UI unit 34 of the terminal device 3 through the transmitting and receiving unit 26, the communication path 4, and the transmitting and receiving unit 33.

In steps S06 to S08, the transmitting and receiving unit 26 may transmit pieces of data of plural setting user interfaces to the terminal device 3 in descending order of priority. In this case, the controller 31 of the terminal device 3 causes the plural setting user interfaces to be displayed on the UI unit 34 in descending order of priority.

Figure 8:
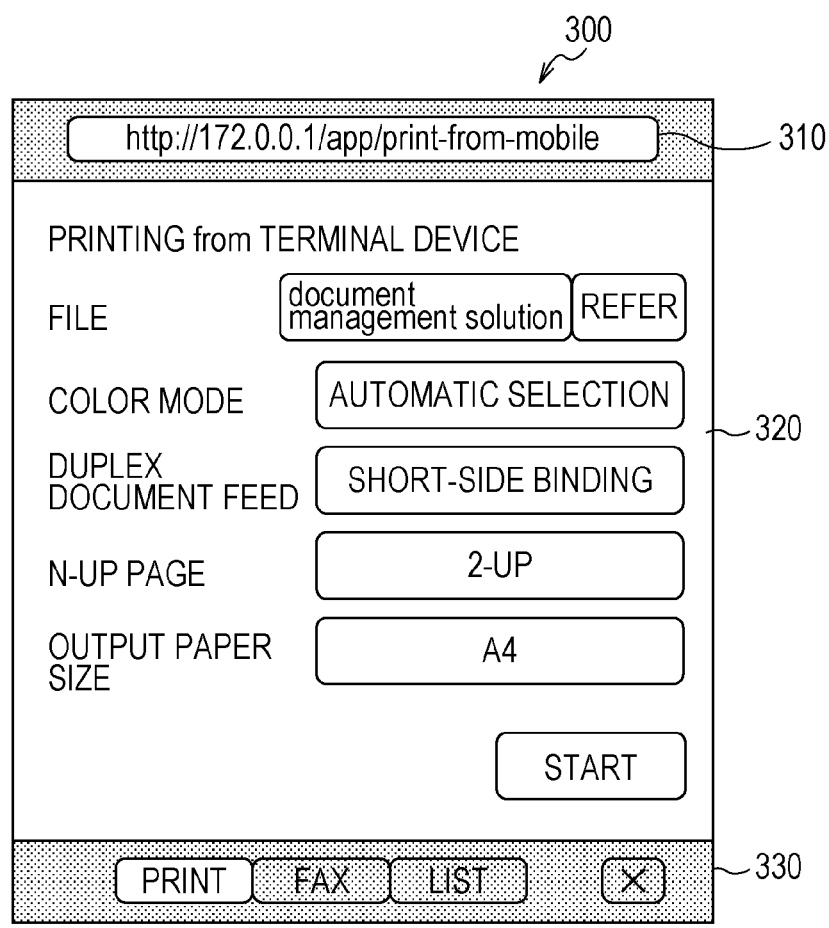
FIG. 8 illustrates an example of a user interface obtained in accordance with an operation state.
Figure 9:
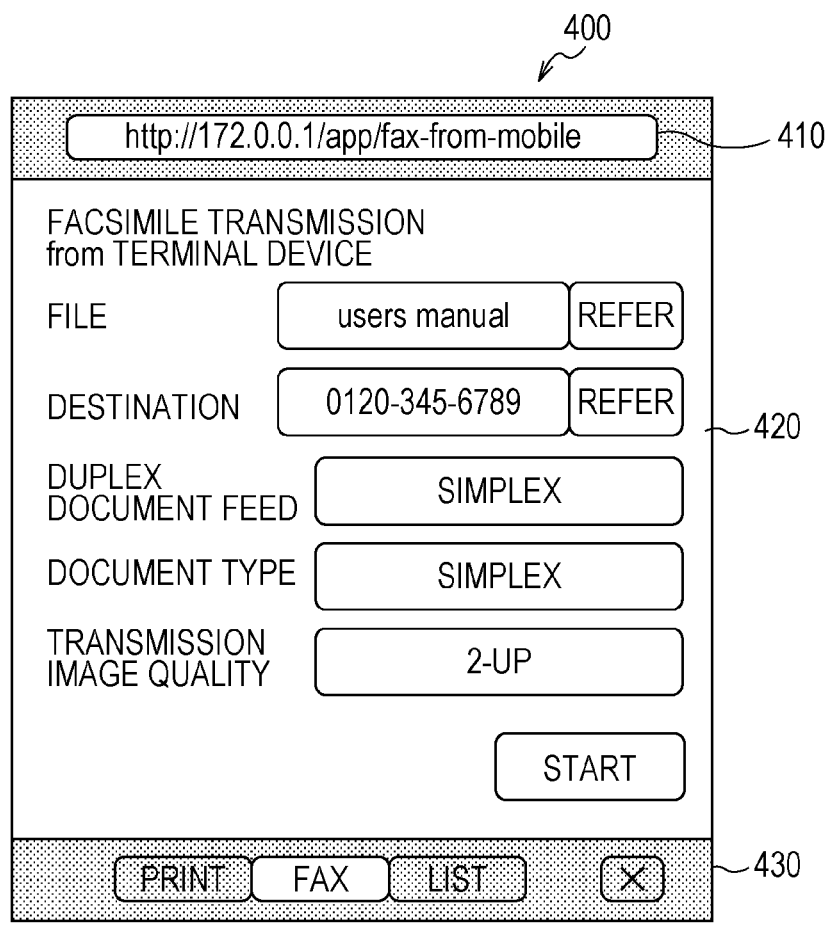
FIG. 9 illustrates an example of a user interface obtained in accordance with an operation state.
Figure 10:
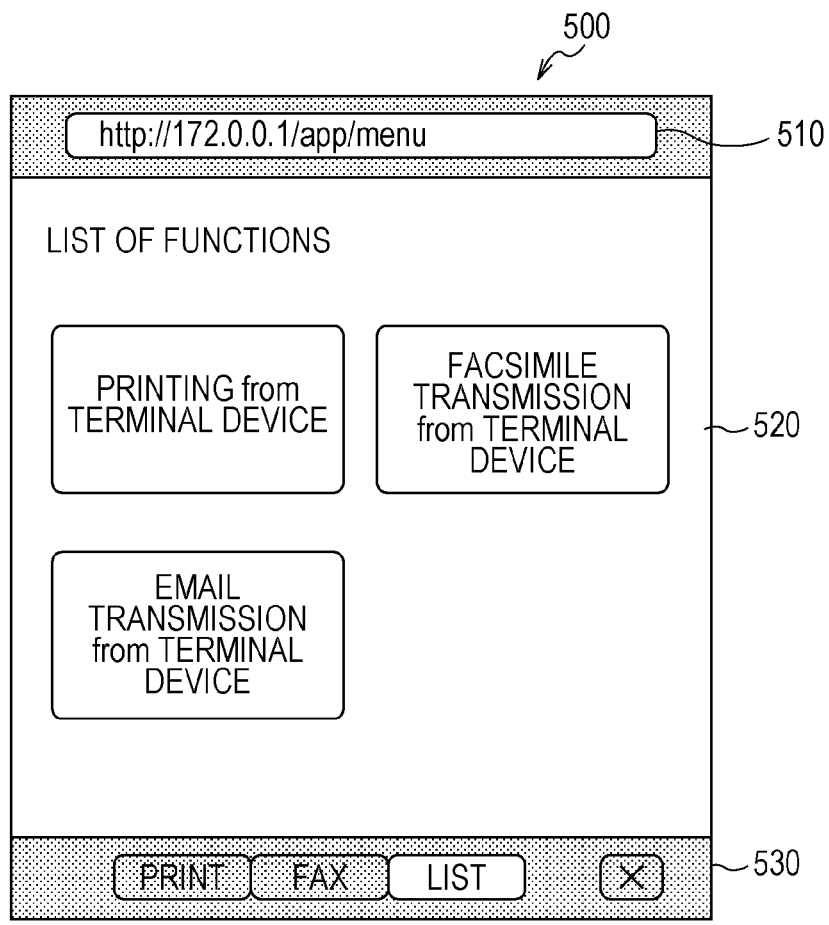
FIG. 10 illustrates an example of a user interface obtained in accordance with an operation state.

A setting user interface to be provided from the UI providing unit 24 of the image processing apparatus 2 will be described with reference to FIGS. 8 to 10. FIGS. 8 to 10 illustrate examples of user interfaces corresponding to operation states.

For example, if the user specifies address data regarding the function "(1) Printing from Terminal device", and the transmitting and receiving unit 33 accesses data of setting user interface using the address data specified by the user, the UI providing unit 24 provides the terminal device 3 with data of a setting user interface regarding the function "(1) Printing from Terminal device".

FIG. 8 illustrates an example of the setting user interface regarding the function "(1) Printing from Terminal device". A setting user interface 300 is a screen for allowing a user to set the operating conditions of the printing unit 22 of the image processing apparatus 2 on the terminal device 3. The setting user interface 300 is provided from the UI providing unit 24 of the image processing apparatus 2 to the UI unit 34 of the terminal device 3 via the communication path 4, and is displayed on the UI unit 34. The setting user interface 300 includes, as an example, a display area 310 in which address data (URL) is displayed, a display area 320 in which setting items for printing are displayed, and a selection portion 330 for allowing the user to select a setting user interface. The user inputs printing conditions, such as the color mode, selection of double sided or duplex printing, the size of an original document, and the name of data to be printed, on the setting user interface 300. The information input by the user on the setting user interface 300 is included in control data. When the setting of the printing conditions has been completed, the user selects a "Start" button on the UI unit 34 of the terminal device 3. When the "Start" button is selected, the transmitting and receiving unit 33 of the terminal device 3 transmits the control data to the image processing apparatus 2 via the communication path 4 as an HTTP request. Further, the transmitting and receiving unit 33 transmits the data to be printed to the image processing apparatus 2 via the communication path 4. The data to be printed is stored in the storage unit 27 of the image processing apparatus 2. The controller 25 of the image processing apparatus 2 analyzes the content of the HTTP request, and outputs a printing instruction to the printing unit 22. The printing unit 22 prints an image on a sheet in accordance with the data under control of the controller 25.

In addition, for example, if the user specifies address data regarding the function "(2) Facsimile transmission from Terminal device" and the transmitting and receiving unit 33 accesses data of a setting user interface using the address data specified by the user, the UI providing unit 24 provides the terminal device 3 with data of a setting user interface regarding the function "(2) Facsimile transmission from Terminal device".

FIG. 9 illustrates an example of the setting user interface regarding the function "(2) Facsimile transmission from Terminal device". A setting user interface 400 is a screen for allowing a user to set the operating conditions of the facsimile transmission unit 23 of the image processing apparatus 2 on the terminal device 3. The setting user interface 400 includes, as an example, a display area 410 in which address data (URL) is displayed, a display area 420 in which setting items for facsimile transmission are displayed, and a selection portion 430 for allowing the user to select a setting user interface. The user inputs facsimile transmission conditions through the setting user interface 400. The information input by the user through the setting user interface 400 is included in control data. When the setting of the facsimile transmission conditions has been completed, the user selects a "Start" button on the UI unit 34 of the terminal device 3. When the "Start" button is selected, the transmitting and receiving unit 33 of the terminal device 3 transmits the control data to the image processing apparatus 2 via the communication path 4 as an HTTP request. Further, the transmitting and receiving unit 33 transmits the data to be transmitted via facsimile to the image processing apparatus 2 via the communication path 4. The data to be transmitted via facsimile is stored in the storage unit 27 of the image processing apparatus 2. The controller 25 of the image processing apparatus 2 analyzes the content of the HTTP request, and outputs a facsimile transmission instruction to the facsimile transmission unit 23. The facsimile transmission unit 23 transmits an image based on the data via facsimile under control of the controller 25.

In addition, for example, if the user specifies address data regarding the function "(3) Display of a list of functions" and the transmitting and receiving unit 33 accesses data of a setting user interface using the address data specified by the user, the UI providing unit 24 provides the terminal device 3 with data of a setting user interface used for the "(3) Display of a list of functions".

FIG. 10 illustrates an example of the setting user interface used for the "(3) Display of a list of functions". A setting user interface 500 is a screen for allowing a user to select the functions of the image processing apparatus 2 on the terminal device 3. The setting user interface 500 includes, as an example, a display area 510 in which address data (URL) is displayed, a display area 520 in which a list of functions of the image processing apparatus 2 is displayed, and a selection portion 530 for allowing the user to select a setting user interface. When the user selects a function of the image processing apparatus 2 on the setting user interface 500, a setting user interface for setting the operating conditions of the function is provided from the UI providing unit 24 of the image processing apparatus 2 to the terminal device 3, and is displayed on the UI unit 34.

The controller 31 of the terminal device 3 may store the address data (URL) selected by the user in the storage unit 35 in association with the operation state information. For example, if the operation state of the terminal device 3 is identical to the operation state indicated by the operation state information stored in the storage unit 35, the controller 31 may display the address data associated with the operation state information on the UI unit 34 upon receipt of an instruction given by the user for acquiring specific information. That is, the terminal device 3 may learn the address data selected by the user, and may display previously selected address data by priority.

As described above, the information providing apparatus according to the exemplary embodiment acquires an operation state of a terminal device, and provides the terminal device with plural pieces of specific information, which are assigned priorities in accordance with the operation state, in descending order of priority. Therefore, specific information relating to the current operation state of the terminal device may be provided from the information providing apparatus to the terminal device without requiring a user to perform setting on the terminal device.

For example, if the information providing apparatus is implemented by the image processing apparatus 2, the image processing apparatus 2 acquires the operation state of the terminal device 3, selects plural functions (image processing), which are assigned priorities in accordance with the operation state, and provides the terminal device 3 with pieces of address data of respective setting user interfaces for setting the operating conditions of the individual functions in descending order of priority. That is, the image processing apparatus 2 selects plural functions that are expected to be executed in accordance with the operation state of the terminal device 3, and provides the terminal device 3 with pieces of address data of respective setting user interfaces for setting the operating conditions of the individual functions, in descending order from the function having the highest probability of being executed. In this manner, pieces of address data of setting user interfaces for functions to be executable after the current operation of the terminal device 3 has been completed are provided from the image processing apparatus 2 to the terminal device 3 in descending order from the function having the highest probability of being executed. Therefore, even if a user does not perform setting on the terminal device 3, a setting user interface for a function to be executable after the current operation has been completed may be provided from the image processing apparatus 2 to the terminal device 3.

For example, even if a user does not perform setting for acquiring a setting user interface for printing, a setting user interface for reading an image, or a setting user interface for facsimile transmission using the terminal device 3, a setting user interface for a function to be executable after the current operation has been completed may be provided from the image processing apparatus 2 to the terminal device 3.

Hardware Configuration

The image processing apparatus 2 discussed above by way of example includes a processor such as a central processing unit (CPU) (not illustrated). The processor executes a program stored in a memory (not illustrated) to implement the respective functions of the UI providing unit 24 and the controller 25. The program is stored in a storage device such as a hard disk drive (HDD) through a recording medium such as a compact disc (CD) or a digital versatile disc (DVD) or via a communication path such as a network. The program may be stored in advance in a storage device such as a hard disk drive. The program stored in a storage device such as a hard disk drive is read by a memory such as a random access memory (RAM) and is executed by a processor such as a CPU to implement the respective functions of the UI providing unit 24 and the controller 25 described above.

The terminal device 3 discussed above by way of example includes a processor such as a CPU (not illustrated). The processor executes a program stored in a memory (not illustrated) to implement the respective functions of the controller 31 and the operation state acquisition unit 32. The program is stored in the memory through a recording medium such as a CD or DVD or via a communication path such as a network. The program may be stored in advance in the memory. In addition, if the terminal device 3 is connected to the image processing apparatus 2 via the communication path 4 or another communication path, a program for implementing the function of the operation state acquisition unit 32 may be transmitted from the image processing apparatus 2 to the terminal device 3, and may be stored in the memory of the terminal device 3. The program stored in the memory is executed by a processor such as a CPU to implement the respective functions of the controller 31 and the operation state acquisition unit 32 described above.

First Modification

Next, a description will be made of an information providing apparatus and an information providing system according to a first modification. The information providing system according to the first modification includes an information providing apparatus, a relay device, and a terminal device. The information providing apparatus and the terminal device are connected to each other via the relay device, and specific information is provided from the information providing apparatus to the terminal device via the relay device.

Figure 11:
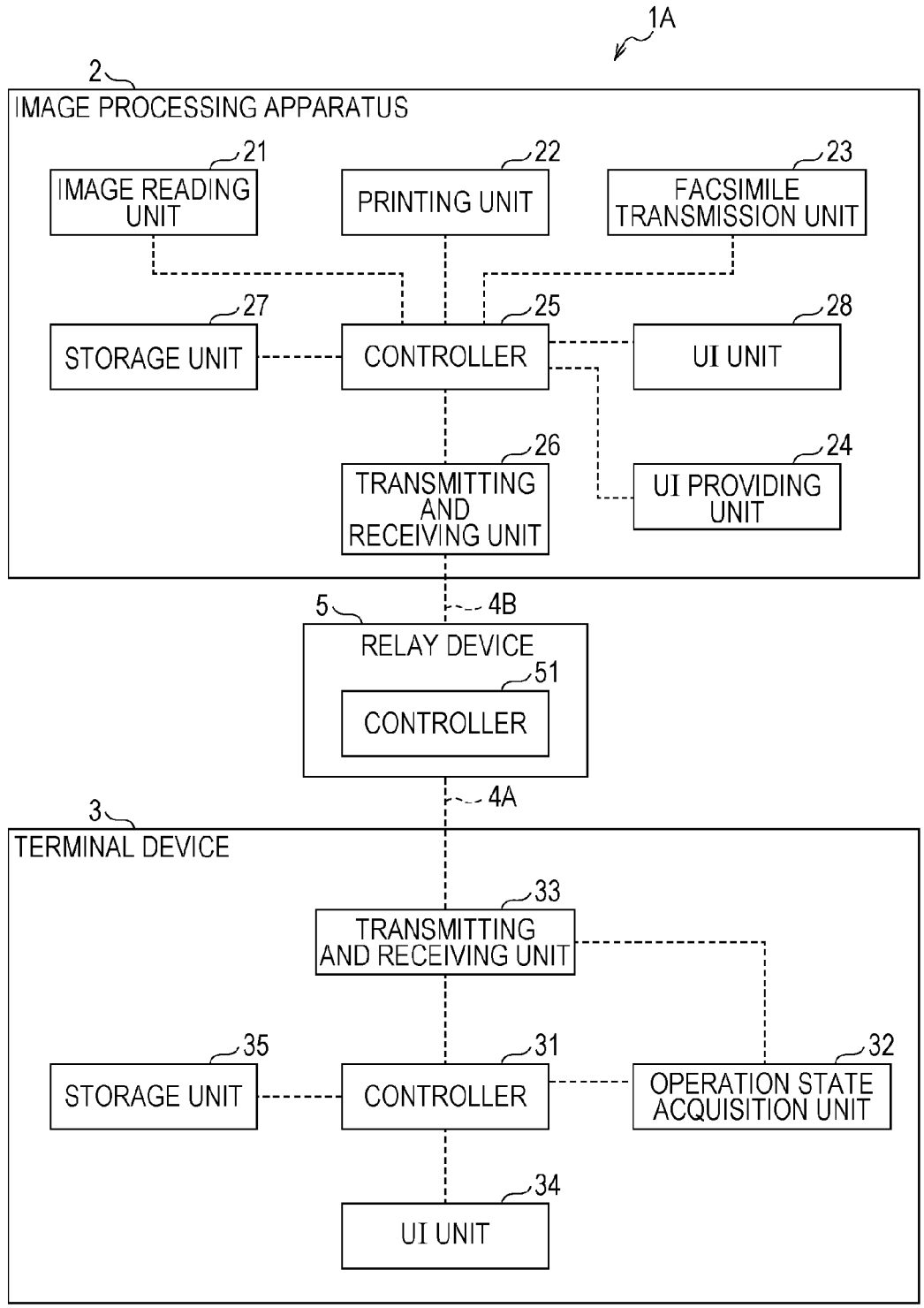
FIG. 11 is a block diagram illustrating an image processing system according to a first modification.

FIG. 11 illustrates an example of an image processing system 1A according to the first modification. The image processing system 1A includes an image processing apparatus 2, a terminal device 3, and a relay device 5. The terminal device 3 and the relay device 5 are connected to each other via a communication path 4A, and the image processing apparatus 2 and the relay device 5 are connected to each other via a communication path 4B. The image processing apparatus 2 and the terminal device 3 transmit and receive data to and from each other via the relay device 5. An information providing apparatus according to the first modification may be implemented by the image processing apparatus 2, by way of example, and an information providing system according to the first modification may be implemented by the image processing apparatus 2, the terminal device 3, and the relay device 5, by way of example. The image processing system 1A according to the first modification is different from the image processing system 1 according to the exemplary embodiment described above in that the relay device 5 is provided.

The communication paths 4A and 4B are substantially the same as the communication path 4 described above. The terminal device 3 and the relay device 5 may be connected to each other via a communication path different from the communication path 4A, and the image processing apparatus 2 and the relay device 5 may be connected to each other via a communication path different from the communication path 4B. Similarly to the exemplary embodiment described above, the different communication paths may be communication paths used for direct connection. In addition, the terminal device 3 and the relay device 5 may be connected to each other via two communication paths, that is, the communication path 4A and another communication path, and the image processing apparatus 2 and the relay device 5 may be connected to each other via two communication paths, that is, the communication path 4B and another communication path.

The relay device 5 may be, as an example, a proxy server, and includes a controller 51. The relay device 5 receives request information and operation state information from the terminal device 3 via the communication path 4A or another communication path. The relay device 5 requests the image processing apparatus 2 to send plural pieces of specific information to be provided to the terminal device 3, in descending order of priority in accordance with the operation state of the terminal device 3 under control of the controller 51. The relay device 5 receives plural pieces of specific information, which are assigned priorities, from the image processing apparatus 2 via the communication path 4B or another communication path. Then, the relay device 5 transmits the plural pieces of specific information, which are assigned priorities, to the terminal device 3 via the communication path 4A or another communication path.

Figure 12:
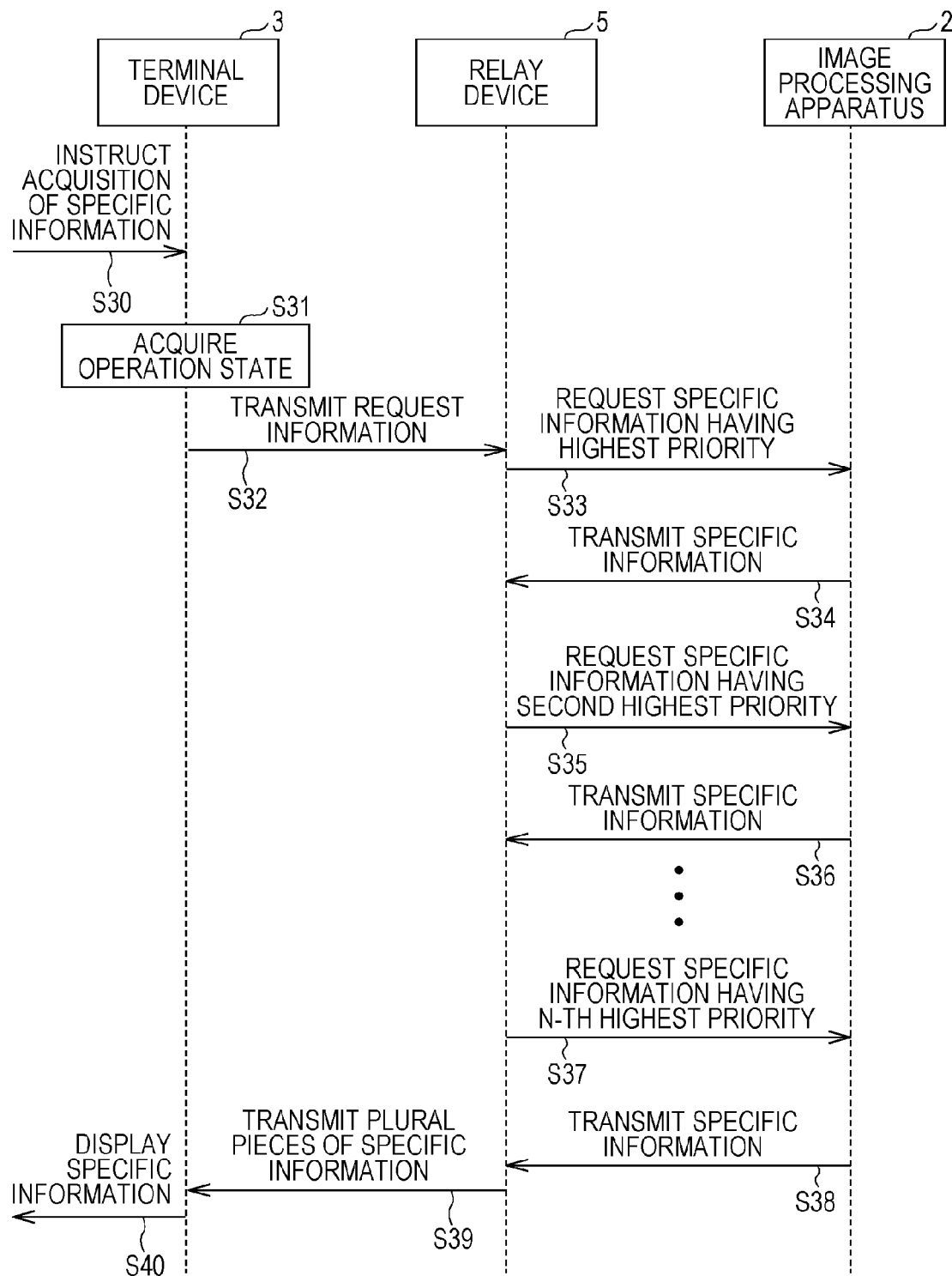
FIG. 12 is a sequence diagram illustrating an example of the procedure of a process performed by the image processing system according to the first modification.

The operation of the image processing system 1A according to the first modification and an example of how a user uses the image processing system 1A will be described with reference to FIG. 12. FIG. 12 is a sequence diagram illustrating an example of the procedure of a process performed by the image processing system 1A.

First, the controller 31 of the terminal device 3 activates application software specified by the user. The user performs an operation using the activated application software. Then, the user gives an instruction using the UI unit 34 of the terminal device 3 for acquiring specific information relating to the operation (step S30). The controller 31 requests the operation state acquisition unit 32 to acquire the specific information.

The operation state acquisition unit 32 acquires the state of the operation being performed by the terminal device 3 (step S31). The operation state acquisition unit 32 outputs request information and operation state information to the transmitting and receiving unit 33.

The transmitting and receiving unit 33 of the terminal device 3 transmits the request information and the operation state information to the relay device 5 via the communication path 4A (step S32). Alternatively, the transmitting and receiving unit 33 may transmit the request information and the operation state information to the relay device 5 via a communication path different from the communication path 4A. The relay device 5 receives the request information and the operation state information from the terminal device 3 via the communication path 4A or the different communication path. Then, the relay device 5 transmits the request information and the operation state information to the image processing apparatus 2 via the communication path 4B or another communication path.

Then, the relay device 5 requests the image processing apparatus 2 to send specific information having the highest priority (top priority) via the communication path 4B or another communication path (step S33). The image processing apparatus 2 transmits the specific information having the highest priority (top priority) to the relay device 5 via the communication path 4B or another communication path in accordance with the operation state indicated by the operation state information (step S34). Then, the relay device 5 requests the image processing apparatus 2 to send specific information having the second highest priority via the communication path 4B or another communication path (step S35). The image processing apparatus 2 transmits the specific information having the second highest priority to the relay device 5 via the communication path 4B or another communication path in accordance with the operation state (step S36). Then, the relay device 5 requests the image processing apparatus 2 to send specific information having the N-th highest priority via the communication path 4B or another communication path (step S37). The image processing apparatus 2 transmits the specific information having the N-th highest priority to the relay device 5 via the communication path 4B or another communication path in accordance with the operation state (step S38). Accordingly, the relay device 5 requests the image processing apparatus 2 to send plural pieces of specific information in descending order of priority, and the image processing apparatus 2 transmits the plural pieces of specific information to the relay device 5 in descending order of priority in accordance with each request.

Then, the relay device 5 transmits the plural pieces of specific information, which are assigned priorities, to the terminal device 3 via the communication path 4A or another communication path (step S39). The transmitting and receiving unit 33 of the terminal device 3 receives the plural pieces of specific information from the relay device 5 via the communication path 4A or another communication path, and outputs the plural pieces of specific information to the controller 31. For example, the transmitting and receiving unit 33 receives pieces of address data of the plural setting user interfaces, which are assigned priorities, from the relay device 5 via the communication path 4A or another communication path, and outputs the plural pieces of address data assigned priorities to the controller 31. The controller 31 causes the plural pieces of specific information acquired from the relay device 5 to be displayed on the UI unit 34 (step S40).

The operation after step S40 and an example of how a user uses the image processing system 1A are substantially the same as those of the image processing system 1 according to the exemplary embodiment described above, and a description thereof is thus omitted.

Accordingly, as in the exemplary embodiment described above, the image processing apparatus 2 according to the first modification provides the terminal device 3 with pieces of address data of setting user interfaces for functions to be executable after the current operation of the terminal device 3 has been completed, in descending order from the function having the highest probability of being executed. Therefore, setting user interfaces for functions to be executable after the current operation has been completed may be provided from the image processing apparatus 2 to the terminal device 3 without requiring a user to perform setting on the terminal device 3.

Second Modification

Next, a description will be made of an information providing apparatus and an information providing system according to a second modification. The information providing system according to the second modification includes an information providing apparatus, an operation state database (DB), and a terminal device. The information providing apparatus, the operation state DB, and the terminal device are connected to one another via a communication path.

Figure 13:
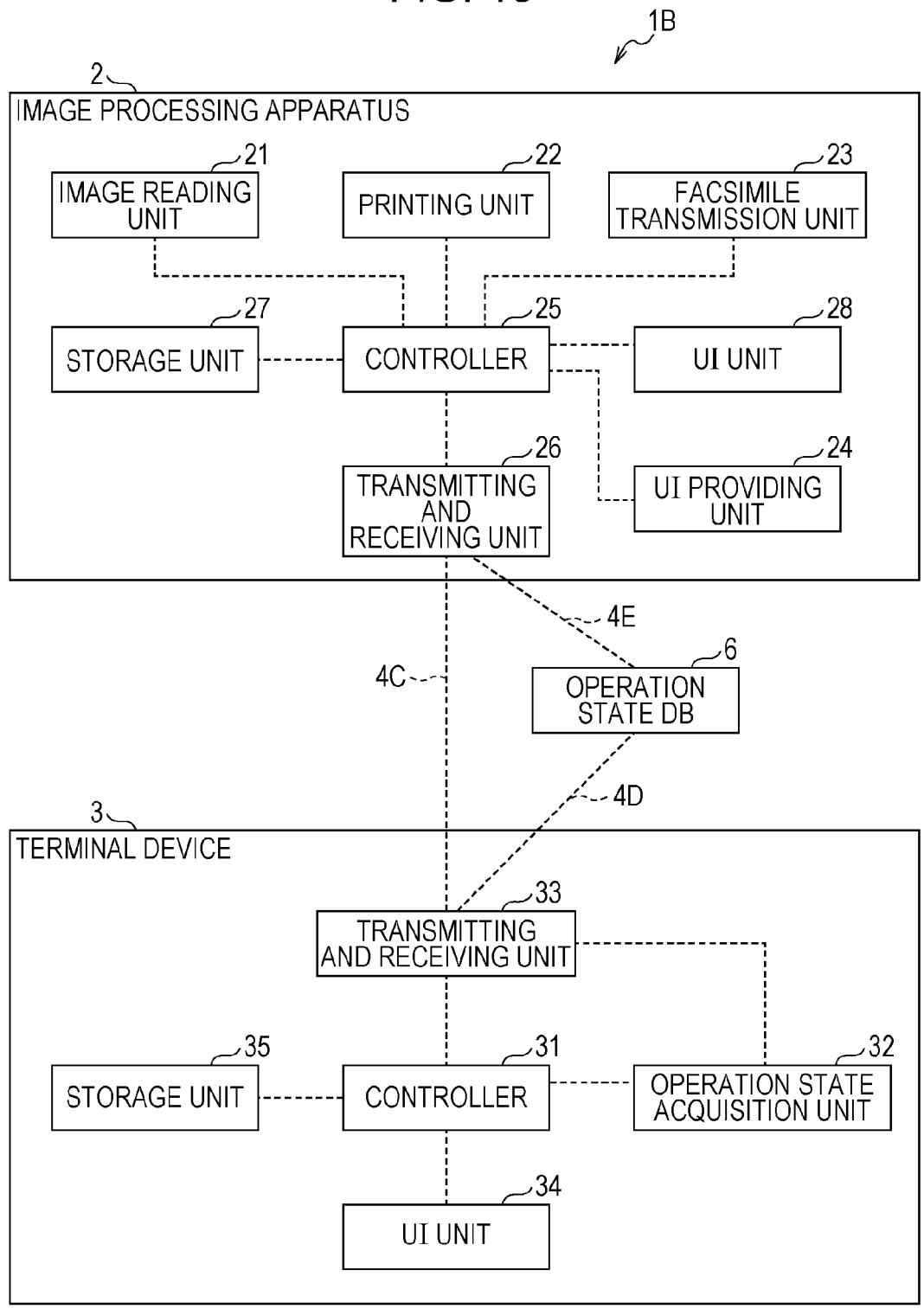
FIG. 13 is a block diagram illustrating an image processing system according to a second modification.

FIG. 13 illustrates an example of an image processing system 1B according to the second modification. The image processing system 1B includes an image processing apparatus 2, a terminal device 3, and an operation state database (DB) 6. The image processing apparatus 2 and the terminal device 3 are connected to each other via a communication path 4C, and the terminal device 3 and the operation state DB 6 are connected to each other via a communication path 4D. Further, the image processing apparatus 2 and the operation state DB 6 are connected to each other via a communication path 4E. The information providing apparatus according to the second modification may be implemented by the image processing apparatus 2, by way of example, and the information providing system according to the second modification may be implemented by the image processing apparatus 2, the terminal device 3, and the operation state DB 6, by way of example. The image processing system 1B according to the second modification is different from the image processing system 1 according to the exemplary embodiment described above in that the operation state DB 6 is provided.

The communication paths 4C, 4D, and 4E are substantially the same as the communication path 4 described above. The image processing apparatus 2 and the terminal device 3 may be connected to each other via a communication path different from the communication path 4C, and the terminal device 3 and the operation state DB 6 may be connected to each other via a communication path different from the communication path 4D. Further, the image processing apparatus 2 and the operation state DB 6 may be connected to each other via a communication path different from the communication path 4E. Similarly to the exemplary embodiment described above, the different communication paths may be communication paths used for direct connection. In addition, the image processing apparatus 2 and the terminal device 3 may be connected to each other via two communication paths, that is, the communication path 4C and another communication path, and the terminal device 3 and the operation state DB 6 may be connected to each other via two communication paths, that is, the communication path 4D and another communication path. Further, the image processing apparatus 2 and the operation state DB 6 may be connected to each other via two communication paths, that is, the communication path 4E and another communication path.

The operation state DB 6 receives operation state information from the terminal device 3, and stores the received operation state information. For example, the operation state DB 6 stores the operation state information in association with request information. Upon receipt of request information from the terminal device 3, the image processing apparatus 2 acquires operation state information associated with the request information from the operation state DB 6.

The operation of the image processing system 1B according to the second modification and an example of how a user uses the image processing system 1B will be described with reference to FIG. 14. FIG. 14 is a sequence diagram illustrating an example of the procedure of a process performed by the image processing system 1B.

First, the controller 31 of the terminal device 3 activates application software specified by the user. The user performs an operation using the activated application software. Then, the user gives an instruction using the UI unit 34 of the terminal device 3 for acquiring specific information relating to the operation (step S50). The controller 31 requests the operation state acquisition unit 32 to acquire the specific information (step S51).

The operation state acquisition unit 32 acquires the state of the operation being performed by the terminal device 3 (step S52). The operation state acquisition unit 32 outputs request information and operation state information to the transmitting and receiving unit 33.

The transmitting and receiving unit 33 of the terminal device 3 transmits the request information and the operation state information to the operation state DB 6 via the communication path 4D, and registers the operation state in the operation state DB 6 (step S53). The operation state DB 6 stores the operation state information in association with the request information. The transmitting and receiving unit 33 may transmit the request information and the operation state information to the operation state DB 6 via a communication path different from the communication path 4D.

Further, the transmitting and receiving unit 33 of the terminal device 3 transmits the request information to the image processing apparatus 2 via the communication path 4C (step S54). The transmitting and receiving unit 33 may transmit the request information to the image processing apparatus 2 via a communication path different from the communication path 4C.

The transmitting and receiving unit 26 of the image processing apparatus 2 receives the request information from the terminal device 3 via the communication path 4C or another communication path, and outputs the request information to the controller 25. The controller 25 acquires operation state information relating to the request information from the operation state DB 6 via the transmitting and receiving unit 26 and the communication path 4E (step S55).

The controller 25 selects plural pieces of specific information, which are assigned priorities, in accordance with the operation state indicated by the operation state information. Then, the transmitting and receiving unit 26 transmits the specific information having the highest priority (top priority) selected by the controller 25 to the terminal device 3 via the communication path 4C or another communication path (step S56). For example, the transmitting and receiving unit 26 firstly transmits address data of a setting user interface for setting the operating conditions of the highest priority function to the terminal device 3. Further, the transmitting and receiving unit 26 transmits the specific information having the second highest priority selected by the controller 25 to the terminal device 3 via the communication path 4C or another communication path (step S57). For example, the transmitting and receiving unit 26 secondly transmits address data of a setting user interface for setting the operating conditions of the second highest priority function to the terminal device 3. Then, the transmitting and receiving unit 26 transmits the specific information having the N-th highest priority selected by the controller 25 to the terminal device 3 via the communication path 4C or another communication path (step S58). Accordingly, the transmitting and receiving unit 26 transmits plural pieces of specific information selected by the controller 25 to the terminal device 3 in descending order of priority.

The transmitting and receiving unit 33 of the terminal device 3 receives the plural pieces of specific information from the image processing apparatus 2 via the communication path 4C or another communication path, and outputs the plural pieces of specific information assigned priorities to the controller 31 (step S59). For example, the transmitting and receiving unit 33 receives pieces of address data of plural setting user interfaces assigned priorities from the image processing apparatus 2 via the communication path 4C or another communication path, and outputs the plural pieces of address data assigned priorities to the controller 31. The controller 31 causes the plural pieces of specific information acquired from the image processing apparatus 2 to be displayed on the UI unit 34 (step S60).

The operation after step S60 and an example of how a user uses the image processing system 1B are substantially the same as those of the image processing system 1 according to the exemplary embodiment described above, and a description thereof is thus omitted.

Accordingly, as in the exemplary embodiment described above, the image processing apparatus 2 according to the second modification provides the terminal device 3 with pieces of address data of setting user interfaces for functions to be executable after the current operation of the terminal device 3 has been completed, in descending order from the function having the highest probability of being executed. Therefore, setting user interfaces for functions to be executable after the current operation has been completed may be provided from the image processing apparatus 2 to the terminal device 3 without requiring a user to perform setting on the terminal device 3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information providing apparatus comprising:
 a first receiving unit configured to receive, from a terminal device, operation state information indicating an operation state of the terminal device, the terminal device being connected to the information providing apparatus via a communication path, the operation state is one of i) a type of application software operating on the terminal device and ii) an operation being performed using the application software operating on the terminal device;
 a transmitting unit configured to transmit, in response to determining, based on the operation state information, that the terminal device is in a specific operation state associated with an image processing operation, one or a plurality of pieces of specific information to the terminal device, the one or a plurality of pieces of specific information being associated with an image processing operation following the specific operation state; and
 a second receiving unit configured to receive control data for an image processing operation to be performed by the information providing apparatus, the control data is set based on the one or a plurality of pieces of specific information by the terminal device,
 wherein the transmitting unit is configured to transmit to the terminal device, as specific information, data and address data of a user interface through which the terminal device transmits command data regarding the image processing operation executable after the specific operation state has been completed.

2. The information providing apparatus according to claim 1, wherein
 when the plurality of pieces of specific information is transmitted to the terminal device, the plurality of pieces of specific information is transmitted in accordance with priorities that are based on the specific operation state and assigned to the plurality of pieces of specific information,
 the priorities are levels of probability of an image processing operation being executed in accordance with the specific operation state, and
 the transmitting unit is configured to transmit the plurality of pieces of specific information to the terminal device in accordance with priorities based on levels of probability of the image processing operation executable after the specific operation state has been completed being executed.

3. The information providing apparatus according to claim 1, wherein
 when the plurality of pieces of specific information is transmitted to the terminal device, the plurality of pieces of specific information is transmitted in accordance with priorities that are based on the specific operation state and assigned to the plurality of pieces of specific information,
 the transmitting unit is configured to transmit, in response to determining, based on the operation state information, that application software regarding the image processing operation executable after the specific operation state has been completed is being executed by the terminal device, the plurality of pieces of specific information to the terminal device in accordance with priorities, the priorities being assigned to the plurality of pieces of specific information in accordance with a type of the application software being executed by the terminal device.

4. The information providing apparatus according to claim 3, wherein
 the transmitting unit is configured to transmit, in response to determining, based on the operation state information, that a state of an operation being performed using the application software, the plurality of pieces of specific information to the terminal device in accordance with priorities, the priorities being assigned to the plurality of pieces of specific information in accordance with the state of the operation being performed using the application software.

5. The information providing apparatus according to claim 4, wherein the image processing operation executable after the specific operation state has been completed comprises a printing operation, and in response to determining, based on the operation state information, that a file is being displayed on the terminal device using the application software, when the plurality of pieces of specific information to be transmitted to the terminal device include specific information regarding a printing operation, the transmitting unit is configured to place a highest priority on the specific information regarding a printing operation, and to transmit the plurality of pieces of specific information to the terminal device.

6. The information providing apparatus according to claim 4, wherein the image processing operation executable after the specific operation state has been completed comprises an image reading operation, and in response to determining, based on the operation state information, that a folder is being displayed on the terminal device using the application software, when the plurality of pieces of specific information to be transmitted to the terminal device include specific information regarding an image reading operation, the transmitting unit is configured to place a highest priority on the specific information regarding an image reading operation, and to transmit the plurality of pieces of specific information to the terminal device.

7. The information providing apparatus according to claim 4, wherein the image processing operation executable after the specific operation state has been completed comprises an image reading operation, and in response to determining, based on the operation state information, that an email is being created on the terminal device using the application software, when the plurality of pieces of specific information to be transmitted to the terminal device include specific information regarding an image reading operation, the transmitting unit is configured to place a highest priority on the specific information regarding an image reading operation, and to transmit the plurality of pieces of specific information to the terminal device.

8. The information providing apparatus according to claim 4, wherein the image processing operation executable after the specific operation state has been completed comprises an image reading operation, and in response to determining, based on the operation state information, that a destination is being displayed on the terminal device using the application software, when the plurality of pieces of specific information to be transmitted to the terminal device include specific information regarding an image reading operation, the transmitting unit is configured to place a highest priority on the specific information regarding an image reading operation, and transmits the plurality of pieces of specific information to the terminal device.

9. An information providing system comprising:
a terminal device; and
an information providing apparatus connected to the terminal device via a communication path,
the information providing apparatus including:
a first receiving unit configured to receive operation state information indicating an operation state of the terminal device, the operation state is one of i) a type of application software operating on the terminal device and ii) an operation being performed using the application software operating on the terminal device;
a transmitting unit configured to transmit, in response to determining, based on the operation state information, that the terminal device is in a specific operation state associated with an image processing operation, one or a plurality of pieces of specific information to the terminal device, the one or a plurality of pieces of specific information being associated with an image processing operation following the specific operation state; and
a second receiving unit configured to receive control data for image processing operation to be performed by the information providing apparatus, the control data is set based on the one or a plurality of pieces of specific information by the terminal device,
wherein the transmitting unit is configured to transmit to the terminal device, as specific information, data and address data of a user interface through which the terminal device transmits command data regarding the image processing operation executable after the specific operation state has been completed.

10. A non-transitory computer readable medium storing a program causing a computer to execute a process, the process comprising:
receiving operation state information indicating an operation state of a terminal device from the terminal device via a communication path, the operation state is one of i) a type of application software operating on the terminal device and ii) an operation being performed using the application software operating on the terminal device;
transmitting, in response to determining, based on the operation state information, that the terminal device is in a specific operation state associated with an image processing operation, one or a plurality of pieces of specific information to the terminal device, the one or a plurality of pieces of specific information being associated with an image processing operation following the specific operation state;
transmitting to the terminal device, as specific information, data and address data of a user interface through which the terminal device transmits command data regarding the image processing operation executable after the specific operation state has been completed; and
receiving control data for an image processing operation to be performed by the computer, the control data is set based on the one or a plurality of pieces of specific information by the terminal device.

* * * * *